(12) United States Patent
Kashiyama et al.

(10) Patent No.: US 9,229,637 B2
(45) Date of Patent: Jan. 5, 2016

(54) VOLUME COPY MANAGEMENT METHOD ON THIN PROVISIONING POOL OF STORAGE SUBSYSTEM

(75) Inventors: Toshihiko Kashiyama, Santa Clara, CA (US); Tomohiro Kawaguchi, Cupertino, CA (US)

(73) Assignee: HITACHI, LTD., Tokyo (JP)

( * ) Notice: Subject to any disclaimer, the term of this patent is extended or adjusted under 35 U.S.C. 154(b) by 959 days.

(21) Appl. No.: 13/299,705

(22) Filed: Nov. 18, 2011

(65) Prior Publication Data

US 2013/0132668 A1    May 23, 2013

(51) Int. Cl.
*G06F 3/06* (2006.01)
*G06F 11/14* (2006.01)

(52) U.S. Cl.
CPC ............ *G06F 3/0608* (2013.01); *G06F 3/065* (2013.01); *G06F 3/067* (2013.01); *G06F 3/0665* (2013.01); *G06F 3/0685* (2013.01); *G06F 11/1446* (2013.01); *G06F 2201/84* (2013.01)

(58) Field of Classification Search
CPC ... G06F 3/0665; G06F 3/0689; G06F 3/0647; G06F 3/061; G06F 3/0644; G06F 12/023; G06F 12/08; G06F 12/0813; G06F 3/0658; G06F 3/0631; G06F 2211/1023; G06F 2211/103; G06F 3/0614; G06F 3/0629; G06F 11/1458; G06F 2201/88; G06F 2201/84; G06F 11/1451; G06F 11/2069; G06F 11/1076; G06F 11/1448; G06F 11/2089; G06F 11/2094; G06F 12/02; G06F 2211/104; G06F 2212/07
USPC ................. 711/100, 111, 114, 154, 161–162, 711/170–173, E12.001–E12.003, E12.016
See application file for complete search history.

(56) References Cited

U.S. PATENT DOCUMENTS

| | | | |
|---|---|---|---|
| 6,681,303 B1 | 1/2004 | Watanabe et al. | |
| 6,823,442 B1 | 11/2004 | Cameron | |
| 7,716,435 B1 | 5/2010 | Allen | |
| 2009/0125680 A1* | 5/2009 | Ninose et al. | 711/114 |
| 2011/0208909 A1* | 8/2011 | Kawaguchi | 711/113 |

* cited by examiner

*Primary Examiner* — Zhuo H Li
(74) *Attorney, Agent, or Firm* — Mattingly & Malur, PC

(57) ABSTRACT

Exemplary embodiments provide integrated thin provisioning pool for primary logical volume and secondary logical volume in a storage subsystem. A storage system comprises a processor; a memory; and a storage controller. In one embodiment, the storage controller is configured to allocate storage area from a first pool in response to a write request, and to control allocation of storage areas for a plurality of related data, which are to be allocated from the first pool, from different specified RAID groups in the first pool. In another embodiment, the storage controller is configured to allocate storage area from a first pool in response to a write request, and to control allocation of storage areas for a plurality of related data, which are to be allocated from the first pool, from different RAID groups in the first pool.

13 Claims, 26 Drawing Sheets

| RAID Gr.# | Capacity | Attribute | Internal/External | RAID Lv. | Disk# or WWN/LUN | Random I/O performance (IOPS) | Sequential I/O performance (MB/s) |
|---|---|---|---|---|---|---|---|
| 1 | 500GB | SSD | Internal | 5 | #0-3 | 100,000 | 1,000 |
| 2 | 500GB | SSD | Internal | 5 | #4-7 | 100,000 | 1,000 |
| 3 | 900GB | 10Krpm | Internal | 5 | #128-131 | 500 | 400 |
| 4 | 900GB | 10Krpm | Internal | 5 | #131-135 | 500 | 400 |
| 5 | 900GB | 10Krpm | Internal | 5 | #136-139 | 500 | 400 |
| 6 | 900GB | 10Krpm | Internal | 5 | #140-143 | 500 | 400 |
| 7 | 12000GB | 7Krpm | Internal | 6 | #256-263 | 300 | 200 |
| 8 | 12000GB | 7Krpm | Internal | 6 | #264-271 | 300 | 200 |
| 9 | 12000GB | 7Krpm | Internal | 6 | #272-279 | 300 | 200 |
| 10 | 12000GB | 7Krpm | Internal | 6 | #280-287 | 300 | 200 |
| 11 | 12000GB | 7Krpm | Internal | 6 | #288-295 | 300 | 200 |
| 12 | 100GB | FE SSD | External | 0 | 01:23:45:67:89:00/0 | 100,000 | 1,000 |
| 13 | 300GB | FE HDD | External | 0 | 01:23:45:67:89:00/1 | 300 | 200 |
| 14 | 150GB | FE SSD | External | 0 | 01:23:45:67:89:01/0 | 100,000 | 1,000 |
| 15 | 200GB | FE HDD | External | 0 | 01:23:45:67:89:01/1 | 300 | 200 |
| 16 | 10000GB | BE | External | 0 | ab:cd:ef:00:00:00/0 | 100 | 100 |
| 17 | 10000GB | BE | External | 0 | ab:cd:ef:00:00:01/0 | 100 | 100 |
| 18 | 10000GB | BE | External | 0 | ab:cd:ef:00:00:01/1 | 100 | 100 |

Fig. 6

| Pool# 701 | Capacity 702 | Used Capacity 703 | RAID Gr.# 704 |
|---|---|---|---|
| 1 | 27600GB | 3245GB | 1-8 |
| 2 | 54750GB | 21863GB | 9-18 |

Fig. 7

| Volume# | Attribute | Pool# | Capacity | Used Capacity |
|---|---|---|---|---|
| 1 | PVOL#1 | 1 | 200GB | 100GB |
| 2 | SVOL#1 | 1 | 200GB | 100GB |
| 3 | PVOL#2 | 1 | 1000GB | 200GB |
| 4 | SVOL#2 | 1 | 1000GB | 200GB |
| 5 | SVOL#3 | 1 | 1000GB | 200GB |
| 6 | PVOL#3 | 1 | 500GB | 300GB |
| 7 | SVOL#4 | 1 | 500GB | 300GB |
| 8 | SVOL#5 | 1 | 500GB | 300GB |
| 9 | SVOL#6 | 1 | 500GB | 300GB |
| 10 | PVOL#4 | 2 | 3000GB | 1000GB |

Fig. 8

| PVOL Volume# | PVOL RG# | SVOL Volume# | SVOL RG# | attribute |
|---|---|---|---|---|
| 1 | 1-5 | 2 | 6-8 | backup |
|   | 5-8 | 4 | 1-3 | backup |
|   |   | 5 | 5-7 | Data Warehouse |
| 3 | 1-5 | 7 | 1-3 | backup 1 |
|   |   | 8 | 4-5 | backup 2 |
| 6 |   | 9 | 6-8 | newest backup |

Fig. 9

| Virtual Vol# | LBA | Raid Group# | Page# |
|---|---|---|---|
| PVOL#1 | 0-99 | 1 | 10 |
| | 100-199 | 2 | 20 |
| | 200-299 | 3 | 30 |
| SVOL#1 | 1000-1099 | 6 | 110 |
| | 1100-1199 | 7 | 120 |
| | 1200-1299 | 8 | 130 |
| PVOL#2 | | | |

Integrated Storage Pool Volume Copy Manager — 1122

Volume Copy (1201)

- ● RAID Group
- ○ Ratio
- ○ I/O performance

| PVOL# | RG | Ratio | I/O perf. |
|---|---|---|---|
| 6 | 1-5 | 62.5% | 3200MB/s |

| SVOL# | RG | Ratio | I/O perf. | SHARE |
|---|---|---|---|---|
| 7 | 1-3 | 37.5% | 2400MB/s | ✓ |
| 8 | 4-5 | 25% | 800MB/s | ✓ |
| 9 | 6-8 | 37.5% | 800MB/s | ☐ |

Add row  ← 1211

RAID Group (1202)

| RAID Gr.# | Capacity | Attribute | Internal/External | RAID Lv. | Disk or RW. Y/LUN | Random I/O performance (IOPS) | Sequential I/O performance (MB/s) |
|---|---|---|---|---|---|---|---|
| 1 | 500GB | SSD | Internal | 5 | #0-3 | 100,000 | 1,000 |
| 2 | 500GB | SSD | Internal | 5 | #4-7 | 100,000 | 1,000 |
| 3 | 900GB | 10Krpm | Internal | 5 | #128-131 | 500 | 400 |
| 4 | 900GB | 10Krpm | Internal | 5 | #131-135 | 500 | 400 |
| 5 | 900GB | 10Krpm | Internal | 5 | #136-139 | 500 | 400 |
| 6 | 900GB | 10Krpm | Internal | 5 | #140-143 | 500 | 400 |
| 7 | 1200GB | 7Krpm | Internal | 6 | #256-263 | 300 | 200 |
| 8 | 1200GB | 7Krpm | Internal | 6 | #264-271 | 300 | 200 |
| 9 | 1200GB | 7Krpm | Internal | 6 | #272-279 | 300 | 200 |
| 10 | 1200GB | 7Krpm | Internal | 6 | #280-287 | 300 | 200 |
| 11 | 1200GB | 7Krpm | Internal | 6 | #288-295 | 300 | 200 |
| 12 | 100GB | FE SSD | External | 0 | 01:23:45:67:89:00/0 | 100,000 | 1,000 |
| 13 | 300GB | FE SSD | External | 0 | 01:23:45:67:89:01/0 | 100,000 | 1,000 |
| 14 | 150GB | FE SSD | External | 0 | 01:23:45:67:89:01/1 | 100,000 | 1,000 |
| 15 | 200GB | FE HDD | External | 0 | ab:cd:ef:00:00:06/0 | 300 | 200 |
| 16 | 1000GB | BE | External | 0 | ab:cd:ef:00:00:00/0 | 100 | 100 |
| 17 | 1000GB | BE | External | 0 | ab:cd:ef:00:00:01/0 | 100 | 100 |
| 18 | 1000GB | BE | External | 0 | ab:cd:ef:00:00:01/1 | 100 | 100 |

Thin Provisioning Pool (1203)

| Pool# | Capacity | Used Capacity | RAID Gr.# |
|---|---|---|---|
| 1 | 27600GB | 3245GB | 1-8 |
| 2 | 54750GB | 21863GB | 9-18 |

Logical Volume (1204)

| Volume# | Attribute | Pool# | Capacity | Used Capacity |
|---|---|---|---|---|
| 1 | PVOL#1 | 1 | 200GB | 100GB |
| 2 | SVOL#1 | 1 | 200GB | 100GB |
| 3 | PVOL#2 | 1 | 1000GB | 200GB |
| 4 | SVOL#2 | 1 | 1000GB | 200GB |
| 5 | PVOL#3 | 1 | 1000GB | 200GB |
| 6 | SVOL#4 | 1 | 500GB | 300GB |
| 7 | SVOL#5 | 1 | 500GB | 300GB |
| 8 | SVOL#6 | 1 | 500GB | 300GB |
| 9 | SVOL#6 | 2 | 500GB | 300GB |
| 10 | PVOL#4 | 2 | 3000GB | 1000GB |

[Apply] [Cancel]

| PVOL Volume# | RG# | SVOL Volume# | RG# | attribute |
|---|---|---|---|---|
| 1 | 1-5 | 2 | 6-8 | backup |
| 3 | 5-8 | 4 | 1-3 | backup |
|  |  | 5 | 1-3 | Data Warehouse |
| 6 | 1-5 | 7 | 6-8 | backup 1 |
|  |  | 8 | 6-8 | backup 2 |
|  |  | 9 | 6-8 | newest backup |

| Virtual Vol# | LBA | Raid Group# | PVOL LBA / Page# |
|---|---|---|---|
| 1 (PVOL) | 0-99 | 1 | 10 |
| | 100-199 | 2 | 20 |
| | 200-299 | 3 | 30 |
| 2 (SVOL) | 1000-1099 | PVOL#1 | 0-99 |
| | 1100-1199 | PVOL#1 | 100-199 |
| | 1200-1299 | 8 | 130 |
| 3 (PVOL) | 0-99 | 5 | 10 |
| | 100-199 | 6 | 20 |
| | 200-299 | 7 | 30 |
| 4 (SVOL) | 1000-1099 | PVOL#1 | 0-99 |
| | 1100-1199 | 2 | 120 |
| | 1200-1299 | 2 | 130 |
| 5 (SVOL) | 2000-2099 | PVOL#1 | 0-99 |
| | 2100-2199 | PVOL#1 | 100-199 |
| | 2200-2299 | 2 | 130 |

Fig. 19

| PVOL Volume# | RG# | SVOL Volume# | RG# | attribute |
|---|---|---|---|---|
| 1 | 1-5 | 2 | 6-8 | backup |
| 3 | 5-8 | 4 | 1-3 | backup |
|  |  | 5 | 5-8 | Data Warehouse |
| 6 | 1-5 | 7 | 1-3 | backup 1 |
|  |  | 8 | 1-3 | backup 2 |
|  |  | 9 | 6-8 | newest backup |

Fig. 22

| Virtual Vol# | LBA | Raid Group# | PVOL LBA / Page# |
|---|---|---|---|
| 1 (PVOL) | 0-99 | 1 | 10 |
| | 100-199 | 2 | 20 |
| | 200-299 | 3 | 30 |
| 2 (SVOL) | 1000-1099 | PVOL#1 | 0-99 |
| | 1100-1199 | PVOL#1 | 100-199 |
| | 1200-1299 | 8 | 130 |
| 3 (PVOL) | 0-99 | 5 | 10 |
| | 100-199 | 6 | 20 |
| | 200-299 | 7 | 30 |
| 4 (SVOL) | 1000-1099 | PVOL#1 | 0-99 |
| | 1100-1199 | 1 | 120 |
| | 1200-1299 | 2 | 130 |
| 5 (SVOL) | 2000-2099 | PVOL#1 | 0-99 |
| | 2100-2199 | PVOL#1 | 100-199 |
| | 2200-2299 | 5 | 230 |

Fig. 23

VOLUME COPY MANAGEMENT METHOD ON THIN PROVISIONING POOL OF STORAGE SUBSYSTEM

BACKGROUND OF THE INVENTION

The present invention relates generally to computer storage systems and, more particularly, to thin-provisioning and copy function in computer storage system.

Storage virtualization technology is widely used. An example is thin provisioning. See, e.g., U.S. Pat. No. 6,823,442. Virtualization technology can improve storage usability and efficiency. The improvement of usability is achieved by concealment of the internal configuration (disk configuration, data location, and so on). The improvement of efficiency is achieved by sharing of the storage resources (disk workload, processor workload, internal bus workload, capacity, and so on). Volume copy technology is also widely used, including, for example, backup, online & batch (for DWH (Data Warehouse), etc.). Examples of copy methods are whole volume copy and copy-on-write snapshot. See, e.g., U.S. Pat. No. 7,716,435.

FIG. 1 shows an example of whole volume copy. When whole volume copy is executed in the case of using thin provisioning technology, a storage administrator has to make thin provisioning pools for primary logical volume (PVOL) and thin provisioning pools for secondary logical volume (SVOL). If a RAID group (RG) has failure, PVOL also has failure. The storage administrator can restore from SVOL. The problem is that it is not efficient to get higher performance. For example, if copied logical volumes are used only for backup, RG #6-8 are used only in the case of backup/restore execution. PVOL #2 may use RG #6-8. It is not easy to provide maintenance because two or more pools are required.

FIG. 2 shows an example of combining thin provisioning pools for PVOL and SVOL. In the example shown, if RG #3 fails, both PVOL #1 and SVOL #1 fail. As a result, it is difficult to combine thin provisioning pools for primary logical volume and secondary logical volume in a storage subsystem because one RAID group failure causes both PVOL failure and SVOL failure. This issue is not recognized by U.S. Pat. Nos. 6,823,442 and 7,716,435.

BRIEF SUMMARY OF THE INVENTION

Exemplary embodiments of the invention provide integrated thin provisioning pool for primary logical volume and secondary logical volume in a storage subsystem.

In accordance with an aspect of the present invention, a storage system comprises: a processor; a memory; and a storage controller configured to allocate storage area from a first pool in response to a write request, and to control allocation of storage areas for a plurality of related data, which are to be allocated from the first pool, from different specified RAID groups in the first pool.

In some embodiments, the plurality of related data comprise a plurality of files. The plurality of related data comprise data stored in a first volume and data stored in a second volume, and the first volume and the second volume are paired. The plurality of related data comprise data stored in a first volume and data stored in a second volume, and data stored in the second volume is copy-on-write of data stored in the first volume. The plurality of related data comprise data stored in a first volume and data stored in a plurality of second volumes corresponding to the same first volume, data stored in the second volumes include copied pages of data in the first volume, and the copied pages are shared among the second volumes. The plurality of related data comprise data stored in a first volume and data stored in a plurality of second volumes corresponding to the same first volume, data stored in the second volumes include multiple copied pages of data in the first volume, and the multiple copied pages are not shared among the second volumes. The plurality of related data comprise data stored in a plurality of volumes, and the storage controller allocates the related data based on attributes of the plurality of volumes.

In specific embodiments, the plurality of related data comprise data stored in a primary volume and data stored one or more corresponding secondary volumes. The storage controller comprises: a command receive module configured to determine whether the storage system has received any volume copy configuration command; and a disk I/O execution module which, if the storage system has not received a volume copy configuration command, determines whether the storage system has received any read I/O and, if yes, refers to a page management table and reads pages from corresponding RAID groups from the page management table, wherein the page management table includes for each primary volume, a virtual volume number, a logical block address, a RAID group number, and a page number, and for each secondary volume, a virtual volume number, a logical block address, a RAID group number, and a page number; determines whether the storage system has received any write I/O and, if yes, refers to a volume copy management table and the page management table and decides whether a write I/O page is updated by determining whether there already exists a corresponding entry for the write I/O page in the page management table and, if no, chooses one RAID group from the corresponding RAID groups of the primary volume in the volume copy management table and updates the page management table, and then regardless of whether there already exists a corresponding entry in the page management table, writes pages to the chosen RAID group, wherein the volume copy management table includes for each primary volume, a primary volume number, RAID group numbers for the primary volume, secondary volume numbers of corresponding one or more secondary volumes, and RAID groups numbers for the corresponding one or more secondary volumes.

In some embodiments, the storage controller comprises a volume copy control module which, if the storage system has received a volume copy configuration command, determines whether a volume copy control input is directly selected RAID groups or RAID group ratio or I/O performance. If the volume copy control input is directly selected RAID groups, the volume copy control module provides update to RAID group numbers of the selected RAID groups in the volume copy management table. If the volume copy control input is RAID group ratio, the volume copy control module performs RAID group allocation from the selected ratio. If the volume copy control input is I/O performance, the volume copy control module performs RAID group allocation from the selected I/O performance. The volume copy control input further comprises, for the primary volume, primary volume number, RAID group numbers, RAID group ratio, and I/O performance, and for each of the one or more corresponding secondary volumes, secondary volume number, RAID group numbers, RAID group ratio, I/O performance, and an indication as to whether the secondary volume can share RAID groups with the primary volume.

In specific embodiments, the volume copy control module is configured to: determine whether update to RAID groups of the primary volume and one or more secondary volumes for storing the related data is changed from a previous setting and, if yes, allocated pages are rebalanced at background task; and determine whether update to RAID groups of the primary volume and one or more secondary volumes for storing the related data is decreasing from a previous setting and, if yes, allocated pages are moved to other RAID groups and the page management table is updated.

In specific embodiments, performing RAID group allocation from the selected ratio by the volume copy control module comprises: for the primary volume in the volume copy control input, allocating RAID groups at the selected ratio, wherein the RAID group number is started from a next volume that a RAID group is lastly allocated as the primary volume; and for each secondary volume in the volume copy control input, if the secondary volume can share RAID groups with the primary volume, allocating RAID groups at the selected ratio from the same RAID groups of the corresponding primary volume, wherein the RAID group number is started from a next volume that a secondary volume which has the same corresponding primary volume is lastly allocated; and determining whether the ratio of the secondary volume is larger than a remainder ratio of remaining unallocated RAID groups, and if yes, indicating an error in allocating RAID groups, and if no, allocating RAID groups at the selected ratio from different RAID groups from those allocated to the corresponding primary volume, wherein the RAID group number is started from a next volume that a secondary volume which has the same corresponding primary volume is lastly allocated.

In specific embodiments, performing RAID group allocation from the selected I/O performance by the volume copy control module comprises: for the primary volume in the volume copy control input, allocating RAID groups from not full capacity RAID groups until a total I/O performance of RAID groups exceeds the selected I/O performance, wherein the RAID group number is started from a next volume that a RAID group is lastly allocated as the primary volume; and for each secondary volume in the volume copy control input, if the secondary volume can share RAID groups with the primary volume, allocating RAID groups at the selected I/O performance from the same RAID groups of the corresponding primary volume, wherein the RAID group number is started from a next volume that a secondary volume which has the same corresponding primary volume is lastly allocated; and determining whether the total I/O performance of remaining unallocated RAID groups is less than the selected I/O performance, and if yes, indicating an error in allocating RAID groups, and if no, allocating RAID groups at the selected I/O performance from different RAID groups from those allocated to the corresponding primary volume, wherein the RAID group number is started from a next volume that a secondary volume which has the same corresponding primary volume is lastly allocated.

In some embodiments, the plurality of related data comprise data stored in a primary volume and data stored one or more corresponding secondary volumes, wherein the data in the one or more corresponding secondary volumes are copy-on-write of data in the primary volume, wherein the storage controller comprises: a command receive module configured to determine whether the storage system has received any volume copy configuration command; and a disk I/O execution module which, if the storage system has not received a volume copy configuration command, determines whether the storage system has received any read I/O and, if yes, refers to a page management table and reads pages from corresponding RAID groups from the page management table, wherein the page management table includes for each primary volume, a virtual volume number, a logical block address, a RAID group number, and a page number, and for each secondary volume, a virtual volume number, a logical block address, a primary volume number or RAID group number, and a primary volume logical block address or a page number for the primary volume number or RAID group number; determines whether the storage system has received any write I/O and, if yes, refers to a volume copy management table and the page management table and decides whether a write I/O page is updated by determining whether there already exists a corresponding entry for the write I/O page in the page management table and, if yes, copies a current page to one RAID group which is chosen from RAID groups for the corresponding secondary volume and updates the page management table of the corresponding secondary volume, and if no, chooses one RAID group from the corresponding RAID groups of the primary volume in the volume copy management table and updates the page management table, and then regardless of whether there already exists a corresponding entry in the page management table, writes pages to the chosen RAID group, wherein the volume copy management table includes for each primary volume, a primary volume number, RAID group numbers for the primary volume, secondary volume numbers of corresponding one or more secondary volumes, and RAID groups numbers for the corresponding one or more secondary volumes.

In specific embodiments, the storage controller comprises a volume copy control module which, if the storage system has received a volume copy configuration command, determines whether a volume copy control input is directly selected RAID groups or RAID group ratio or I/O performance. If the volume copy control input is directly selected RAID groups, the volume copy control module provides update to RAID group numbers of the selected RAID groups in the volume copy management table. If the volume copy control input is RAID group ratio, the volume copy control module performs RAID group allocation from the selected ratio. If the volume copy control input is I/O performance, the volume copy control module performs RAID group allocation from the selected I/O performance. The volume copy control input further comprises, for the primary volume, primary volume number, RAID group numbers, RAID group ratio, and I/O performance, and for each of the one or more corresponding secondary volumes, secondary volume number, RAID group numbers, RAID group ratio, I/O performance, and an indication as to whether the secondary volume can share RAID groups with the primary volume.

In some embodiments, the volume copy control module is configured to: determine whether update to RAID groups of the primary volume and one or more secondary volumes for storing the related data is changed from a previous setting and, if yes, allocated pages are rebalanced at background task; and determine whether update to RAID groups of the primary volume and one or more secondary volumes for storing the related data is decreasing from a previous setting and, if yes, allocated pages are moved to other RAID groups and the page management table is updated.

In specific embodiments, performing RAID group allocation from the selected ratio by the volume copy control module comprises: for the primary volume in the volume copy control input, allocating RAID groups at the selected ratio, wherein the RAID group number is started from a next volume that a RAID group is lastly allocated as the primary volume; and for each secondary volume in the volume copy control input, if the secondary volume can share RAID groups with the primary volume, allocating RAID groups at the selected ratio from the same RAID groups of the corresponding primary volume, wherein the RAID group number is started from a next volume that a secondary volume which has the same corresponding primary volume is lastly allocated; and determining whether the ratio of the secondary volume is larger than a remainder ratio of remaining unallocated RAID groups, and if yes, indicating an error in allocating RAID groups, and if no, allocating RAID groups at the selected ratio from different RAID groups from those allocated to the corresponding primary volume, wherein the RAID group number is started from a next volume that a secondary volume which has the same corresponding primary volume is lastly allocated. Performing RAID group allocation from the selected I/O performance by the volume copy control module comprises: for the primary volume in the volume copy control input, allocating RAID groups from not full capacity RAID groups until a total I/O performance of RAID groups exceeds the selected I/O performance, wherein the RAID group number is started from a next volume that a RAID group is lastly allocated as the primary volume; and for each secondary volume in the volume copy control input, if the secondary volume can share RAID groups with the primary volume, allocating RAID groups at the selected I/O performance from the same RAID groups of the corresponding primary volume, wherein the RAID group number is started from a next volume that a secondary volume which has the same corresponding primary volume is lastly allocated; and determining whether the total I/O performance of remaining unallocated RAID groups is less than the selected I/O performance, and if yes, indicating an error in allocating RAID groups, and if no, allocating RAID groups at the selected I/O performance from different RAID groups from those allocated to the corresponding primary volume, wherein the RAID group number is started from a next volume that a secondary volume which has the same corresponding primary volume is lastly allocated.

In some embodiments, the plurality of related data comprise data stored in a primary volume and a plurality of corresponding secondary volumes. The storage controller allocates the related data such that the plurality of secondary volumes corresponding to the same primary volume can have multiple copied pages that are not shared among the secondary volumes. The storage controller comprises: a command receive module configured to determine whether the storage system has received any volume copy configuration command; and a disk I/O execution module which, if the storage system has not received a volume copy configuration command, determines whether the storage system has received any read I/O and, if yes, refers to a page management table and reads pages from corresponding RAID groups from the page management table, wherein the page management table includes for each primary volume, a virtual volume number, a logical block address, a RAID group number, and a page number, and for each secondary volume, a virtual volume number, a logical block address, a primary volume number or RAID group number, and a primary volume logical block address or a page number for the primary volume number or RAID group number; determines whether the storage system has received any write I/O and, if yes, refers to a volume copy management table and the page management table and decides whether a write I/O page is updated by determining whether there already exists a corresponding entry for the write I/O page in the page management table and, if yes, copies a current page to one RAID group which is chosen from RAID groups for the plurality of corresponding secondary volumes and updates the page management table of the corresponding secondary volumes, and if no, chooses one RAID group from the corresponding RAID groups of the primary volume in the volume copy management table and updates the page management table, and then regardless of whether there already exists a corresponding entry in the page management table, writes pages to the chosen RAID group, wherein the volume copy management table includes for each primary volume, a primary volume number, RAID group numbers for the primary volume, secondary volume numbers of the corresponding secondary volumes, and RAID groups numbers for the corresponding secondary volumes.

In specific embodiments, the storage controller comprises a volume copy control module which, if the storage system has received a volume copy configuration command, determines whether a volume copy control input is directly selected RAID groups or RAID group ratio or I/O performance. If the volume copy control input is directly selected RAID groups, the volume copy control module provides update to RAID group numbers of the selected RAID groups in the volume copy management table. If the volume copy control input is RAID group ratio, the volume copy control module performs RAID group allocation from the selected ratio. If the volume copy control input is I/O performance, the volume copy control module performs RAID group allocation from the selected I/O performance. The volume copy control input further comprises, for the primary volume, primary volume number, RAID group numbers, RAID group ratio, and I/O performance, and for each of the corresponding secondary volumes, secondary volume number, RAID group numbers, RAID group ratio, I/O performance, and an indication as to whether the secondary volume can share RAID groups with the primary volume.

In some embodiments, the volume copy control module is configured to: determine whether update to RAID groups of the primary volume and secondary volumes for storing the related data is changed from a previous setting and, if yes, allocated pages are rebalanced at background task; determine whether update to RAID groups of the primary volume and secondary volumes for storing the related data is decreasing from a previous setting and, if yes, allocated pages are moved to other RAID groups and the page management table is updated; and determine whether the RAID group for each of the secondary volumes is merged or not, and if yes, then determine whether the merged secondary volume also has copied page or not, and if no, move a previous page to one RAID group which is chosen from new RAID groups and updates the RAID group number and page number entries of the page management table, and if yes, update the RAID group number and page number entries of the page management table to those of the merged secondary volume; and determine whether the previous page is referenced from other secondary volumes or not, and if yes delete the previous page.

In specific embodiments, performing RAID group allocation from the selected ratio by the volume copy control module comprises: for the primary volume in the volume copy control input, allocating RAID groups at the selected ratio, wherein the RAID group number is started from a next volume that a RAID group is lastly allocated as the primary volume; and for each secondary volume in the volume copy control input, if the secondary volume can share RAID groups with the primary volume, allocating RAID groups at the selected ratio from the same RAID groups of the corresponding primary volume, wherein the RAID group number is started from a next volume that a secondary volume which has the same corresponding primary volume is lastly allocated; and determining whether the ratio of the secondary volume is larger than a remainder ratio of remaining unallocated RAID groups, and if yes, indicating an error in allocating RAID groups, and if no, allocating RAID groups at the selected ratio from different RAID groups from those allocated to the corresponding primary volume, wherein the RAID group number is started from a next volume that a secondary volume which has the same corresponding primary volume is lastly allocated. Performing RAID group allocation from the selected I/O performance by the volume copy control module comprises: for the primary volume in the volume copy control input, allocating RAID groups from not full capacity RAID groups until a total I/O performance of RAID groups exceeds the selected I/O performance, wherein the RAID group number is started from a next volume that a RAID group is lastly allocated as the primary volume; and for each secondary volume in the volume copy control input, if the secondary volume can share RAID groups with the primary volume, allocating RAID groups at the selected I/O performance from the same RAID groups of the corresponding primary volume, wherein the RAID group number is started from a next volume that a secondary volume which has the same corresponding primary volume is lastly allocated; and determining whether the total I/O performance of remaining unallocated RAID groups is less than the selected I/O performance, and if yes, indicating an error in allocating RAID groups, and if no, allocating RAID groups at the selected I/O performance from different RAID groups from those allocated to the corresponding primary volume, wherein the RAID group number is started from a next volume that a secondary volume which has the same corresponding primary volume is lastly allocated.

In accordance with another aspect of this invention, a storage system comprises: a processor; a memory; and a storage controller configured to allocate storage area from a first pool in response to a write request, and to control allocation of storage areas for a plurality of related data, which are to be allocated from the first pool, from different RAID groups in the first pool.

These and other features and advantages of the present invention will become apparent to those of ordinary skill in the art in view of the following detailed description of the specific embodiments.

BRIEF DESCRIPTION OF THE DRAWINGS

FIG. 6 shows an example of a Raid Group Management Table.

FIG. 7 shows an example of a Thin Provisioning Pool Management Table.

FIG. 8 shows an example of a Logical Volume Management Table.

FIG. 9 shows an example of a Volume Copy Management Table according to the first embodiment.

FIG. 10 shows an example of a Page Management Table according to the first embodiment.

FIG. 12 shows an example of the configuration of the Integrated Storage Pool Volume Copy Manager.

FIG. 18 shows an example of a Volume Copy Management Table according to the second embodiment.

FIG. 19 shows an example of a Page Management Table according to the second embodiment.

FIG. 22 shows an example of a Volume Copy Management Table according to the third embodiment.

FIG. 23 shows an example of a Page Management Table according to the third embodiment.

DETAILED DESCRIPTION OF THE INVENTION

Figure 1:
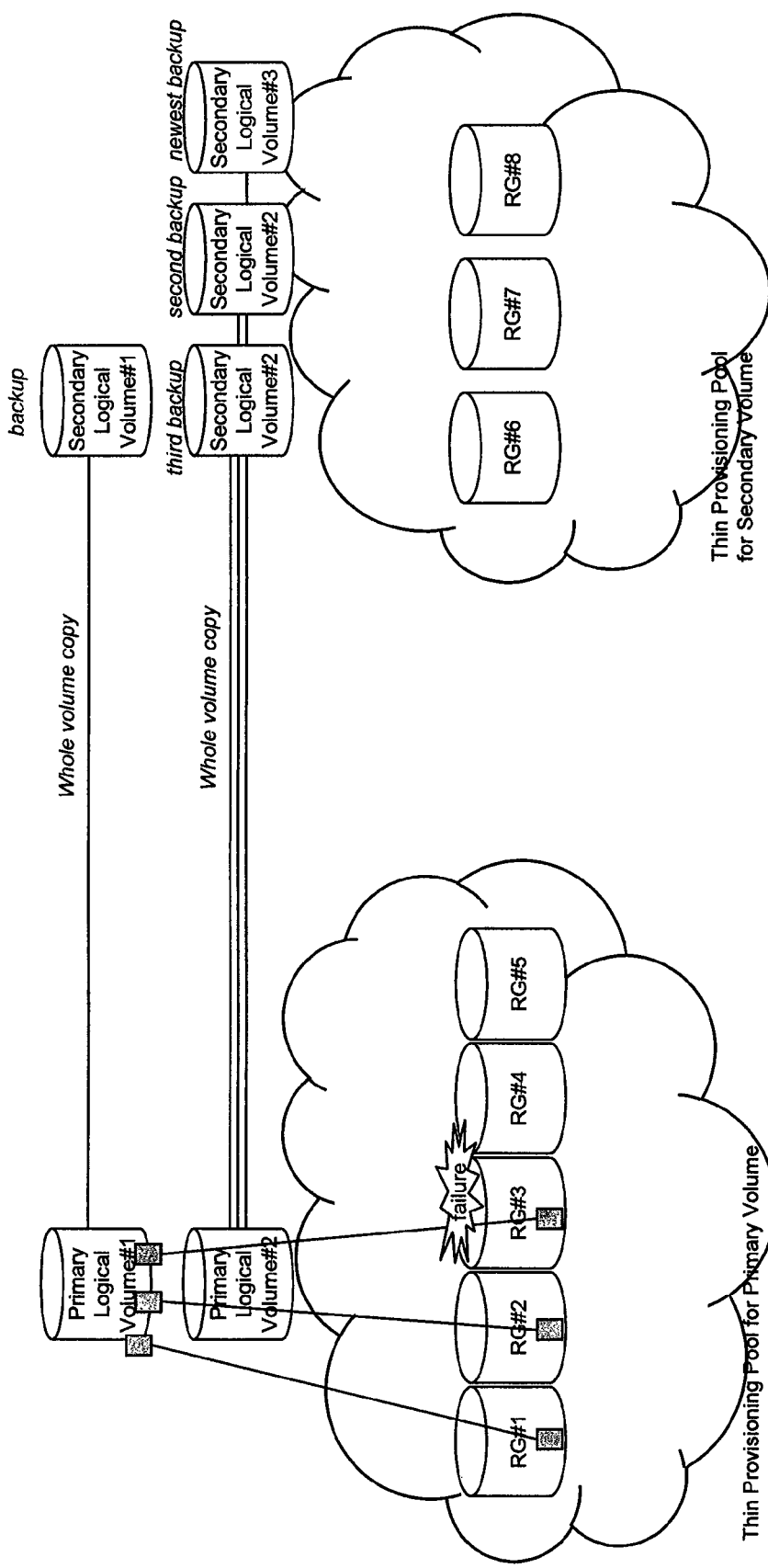
FIG. 1 shows an example of whole volume copy.
Figure 2:
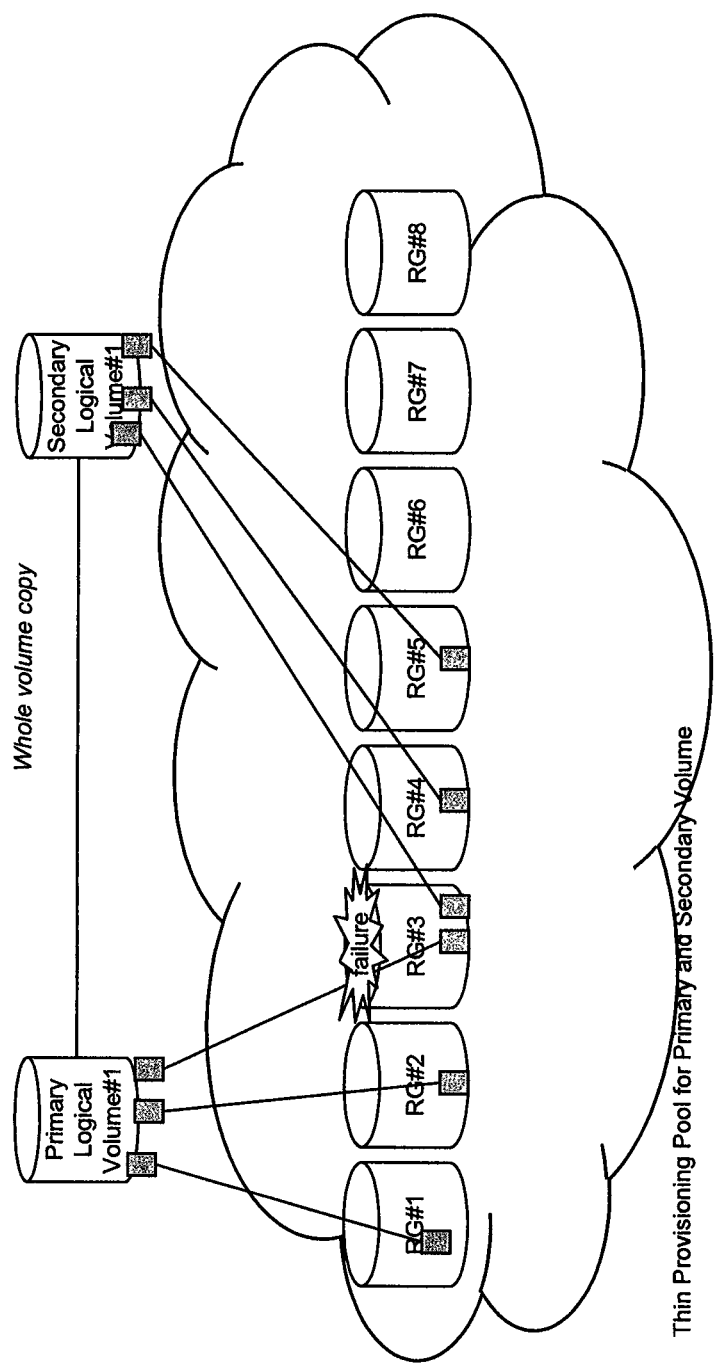
FIG. 2 shows an example of combining thin provisioning pools for PVOL and SVOL.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for an integrated thin provisioning pool for primary logical volume and secondary logical volume in a storage subsystem.

First Embodiment

Figure 3:
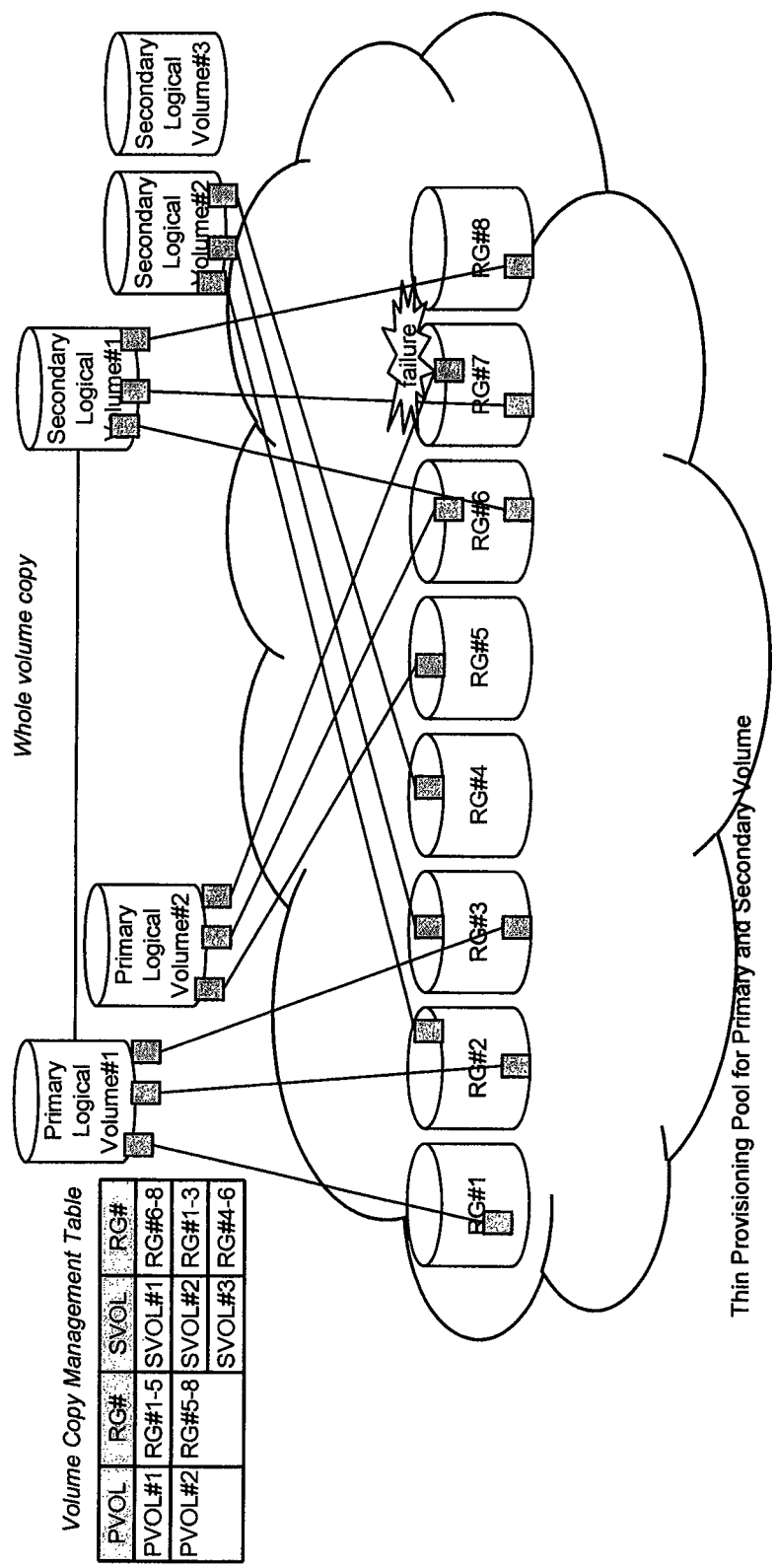
FIG. 3 shows an example of a thin provisioning pool for PVOLs and SVOLs and a volume copy management table for managing whole volume copy according to the first embodiment.

FIG. 3 shows an example of a thin provisioning pool for PVOLs and SVOLs and a volume copy management table for managing whole volume copy according to the first embodiment. The volume copy management table manages RAID groups to which each logical volume can write pages. Then, write pages for the SVOL are written to different RAID groups from those for the PVOL.

Figure 4:
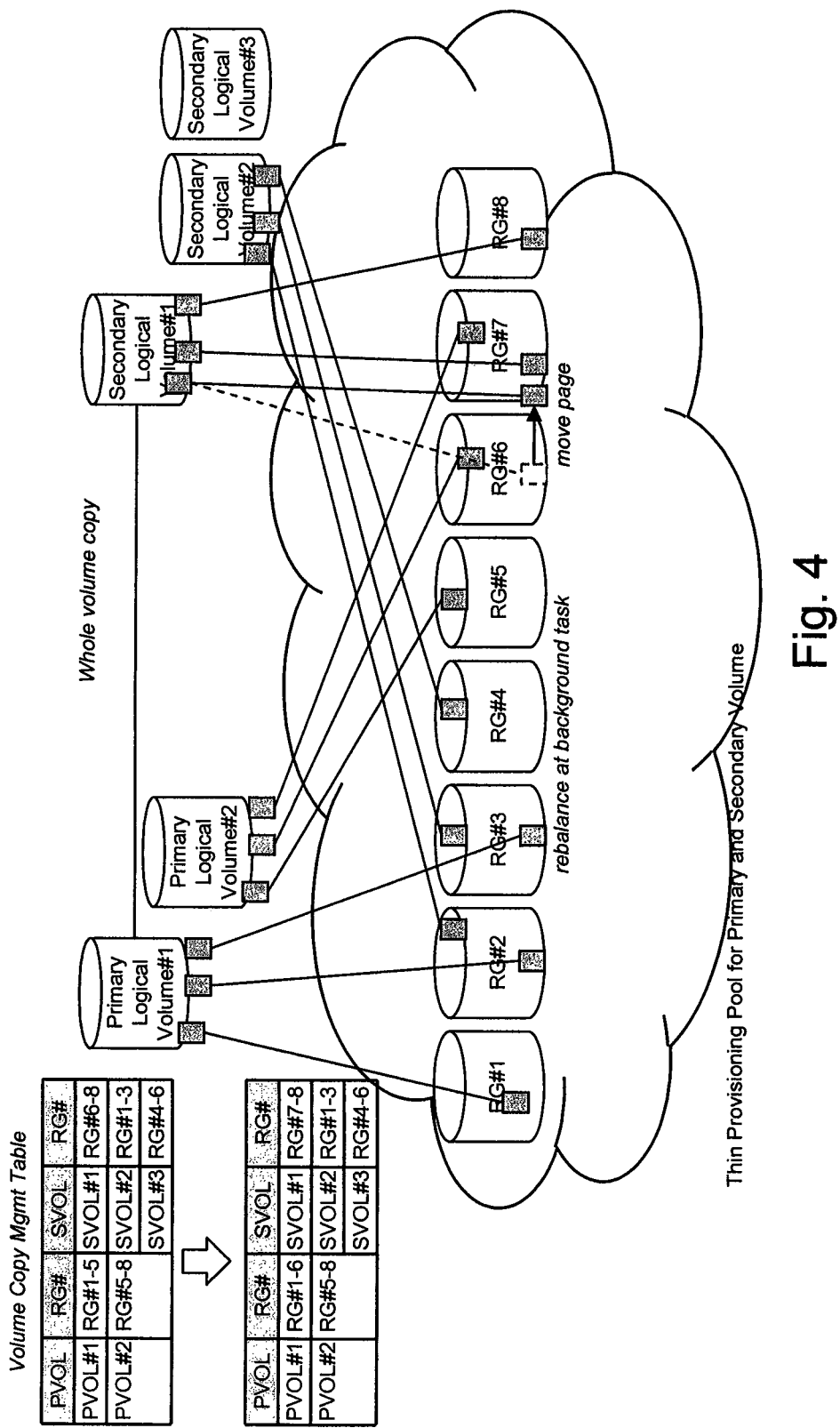
FIG. 4 shows an example of a thin provisioning pool for PVOLs and SVOLs and a volume copy management table that is changed.

FIG. 4 shows an example of a thin provisioning pool for PVOLs and SVOLs and a volume copy management table that is changed. If RAID groups for logical volume decrease, pages of corresponding RGs are moved to other RGs. If RAID groups for logical volume do not decrease, pages of current RGs are rebalanced at background task. For example, PVOL #1 requires more performance, and hence RGs for PVOL #1 are changed from RG #1-5 to RG #1-6. At the same time, RGs for SVOL #1 should be changed from RG #6-8 to RG #7-8 to prevent concurrent failures. Pages of RG #6 are moved to RG #7 and #8. As a result, it improves manageability and I/O performance of storage subsystem.

Figure 5:
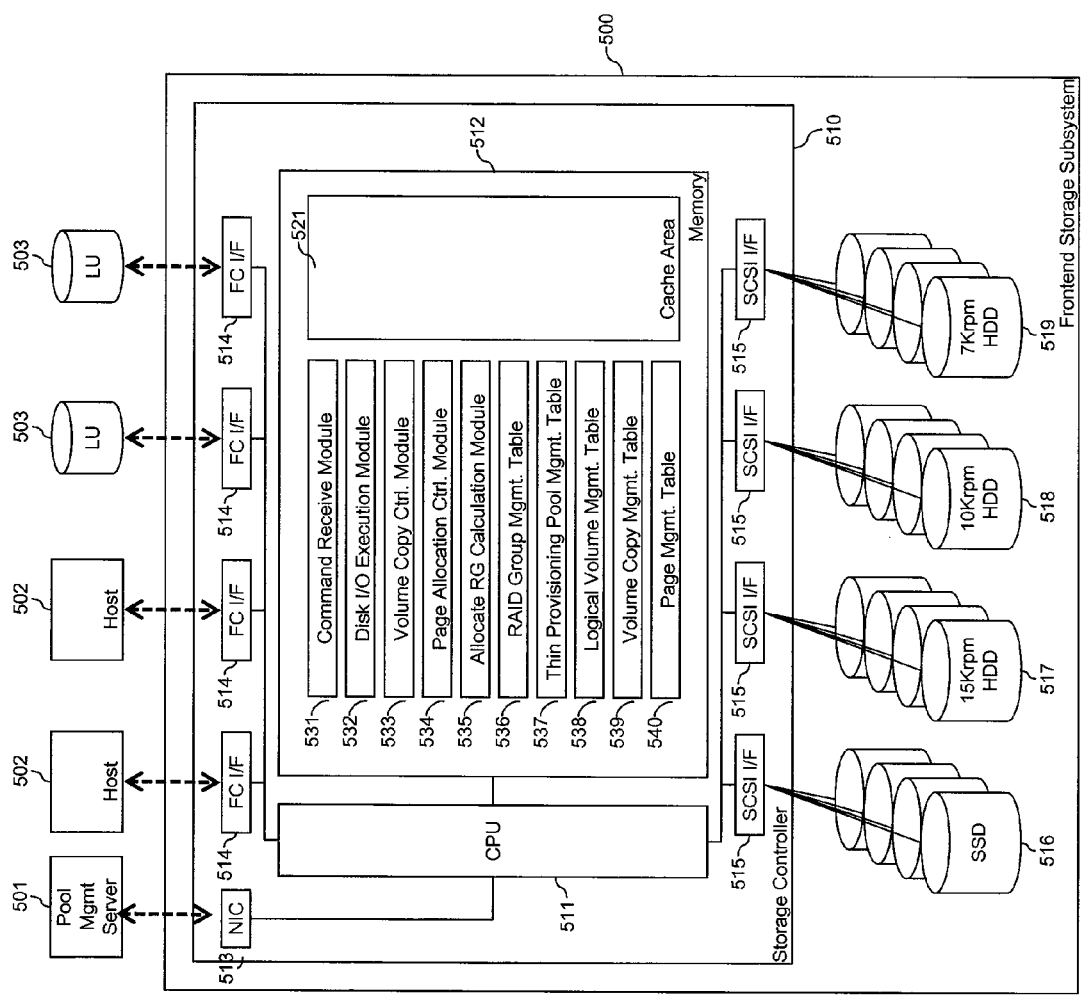
FIG. 5 illustrates an example of the configuration and functionality of a system in which the method and apparatus of the invention may be applied.

FIG. 5 illustrates an example of the configuration and functionality of a system in which the method and apparatus of the invention may be applied. A pool management server 501 has GUI (Graphical User Interface) to receive input from the user. Logical Units (LUs) 503 of external storage subsystems are provided. A frontend storage subsystem 500 includes a storage controller 510 having a CPU 511, a memory 512, a network interface card (NIC) 513, fibre channel interfaces (FC I/Fs) 514, and SCSI I/Fs 515. The memory includes a cache area 521 and various modules and tables. A Command Receive Module 531 performs a main process of command receive (see flow diagram of FIG. 13). Input commands are sent from the pool management server 501 via the NIC 513.

A Disk I/O Execution Module 532 and a Volume Copy Control Module 533 are called by the Command Receive Module 531. The Disk I/O Execution Module 532 performs steps 1304-1311 of the flow diagram of FIG. 13. The Disk I/O Execution Module 532 is configured to read/write to SSD 516, 15 Krpm HDD 517, 10 Krpm HDD 518, and 7 Krpm HDD 519 via the SCSI I/F 515. The Disk I/O Execution Module 532 manages a Page Management Table 540. The Volume Copy Control Module 533 performs Volume Copy Configuration Processing (see flow diagram of FIG. 14). The Volume Copy Control Module 533 manages RG information whereby each logical volume can read/write by the input information in the pool management server 501. The Volume Copy Control Module 533 manages a RAID Group Management Table 536, a Thin Provisioning Pool Management Table 537, a Logical Volume Management Table 538, and a Volume Copy Management Table 539. A Page Allocation Control Module 534 and an Allocate RG Calculation Module 535 are called by the Volume Copy Control Module 533. The Page Allocation Control Module 534 performs Volume Copy Configuration Processing (see flow diagram of FIG. 14 (1406-1410)). When the Volume Copy Management Table 539 is updated, the Page Allocation Control Module 534 is called. The program moves pages to other RGs if necessary. The Allocate RG Calculation Module 535 performs RG Allocation from the selected ratio (see flow diagram of FIG. 15) and RG Allocation from the selected I/O performance (see flow diagram of FIG. 16). The program calculates RG information where each logical volume can read/write by the input policy (RG ratio, I/O performance) in the Pool Management Server 500.

The RAID Group Management Table 536 manages RAID group information (see FIG. 6). The Thin Provisioning Pool Management Table 537 manages thin provisioning pool information (see FIG. 7). The Logical Volume Management Table 538 manages logical volume information (see FIG. 8). The Volume Copy Management Table 539 manages volume copy information (see FIG. 9). The Page Management Table 540 manages page allocation information (see FIG. 10).

FIG. 6 shows an example of a Raid Group Management Table 536. The table has columns of RAID Group #601, Capacity 602, Attribute 603, Internal/External 604, RAID Level 605, Disk# or WWN/LUN 606, Random I/O Performance (IOPS) 607, and Sequential I/O Performance (MB/s) 608. The Attribute column 603 stores the media type and connection type of the RAID group. In the Disk# or WWN/LUN column 606, if the disk is internal disk, it stores the disk ID of the Frontend Storage Subsystem 500, and if the disk is external volume, it stores the volume information which can be identified in the system (e.g., WWN (World Wide Name) and LUN (Logical Unit number)).

FIG. 7 shows an example of a Thin Provisioning Pool Management Table 537. The table has columns of Pool #701, Capacity 702, Used Capacity 703, and RAID Group #704.

FIG. 8 shows an example of a Logical Volume Management Table 538. The table has columns of Volume #801, Attribute 802, Pool #803, Capacity 804, and Used Capacity 805.

FIG. 9 shows an example of a Volume Copy Management Table 539 according to the first embodiment. The table has columns of PVOL Volume #901, PVOL RG #902, SVOL Volume #903, SVOL RG #904, and Attribute 905. The PVOL RG # column 902 lists the RGs for the PVOL volume # column 901. Write pages are allocated to the RGs. The SVOL RG # column 904 lists the RGs for the SVOL volume # column 903. Write pages are allocated to the RGs. The Attribute column 905 is optional and examples include backup, data warehouse, and newest backup. In the example shown, the RGs for Volume #1 and the RGs for Volume #2 are different. The RGs for Volume #3 and the RGs for Volume #4 are different, but Volume #5 partly uses RGs for Volume #3 (RG #5, 6). The RGs for Volume #6 and the RGs for Volume #9 (newest backup) are different, but Volume #7, 8 may use the RGs for Volume #6.

FIG. 10 shows an example of a Page Management Table 540 according to the first embodiment. The table has columns of Virtual Vol #1001, LBA 1002, RAID Group #1003, and Page #1004. In the example shown, pages of PVOL #1 whose LBA is 0-99 are allocated to page 10 of RG #1, while pages of SVOL #1 whose LBA is 1000-1099 are allocated to page 110 of RG #6.

Figure 11:
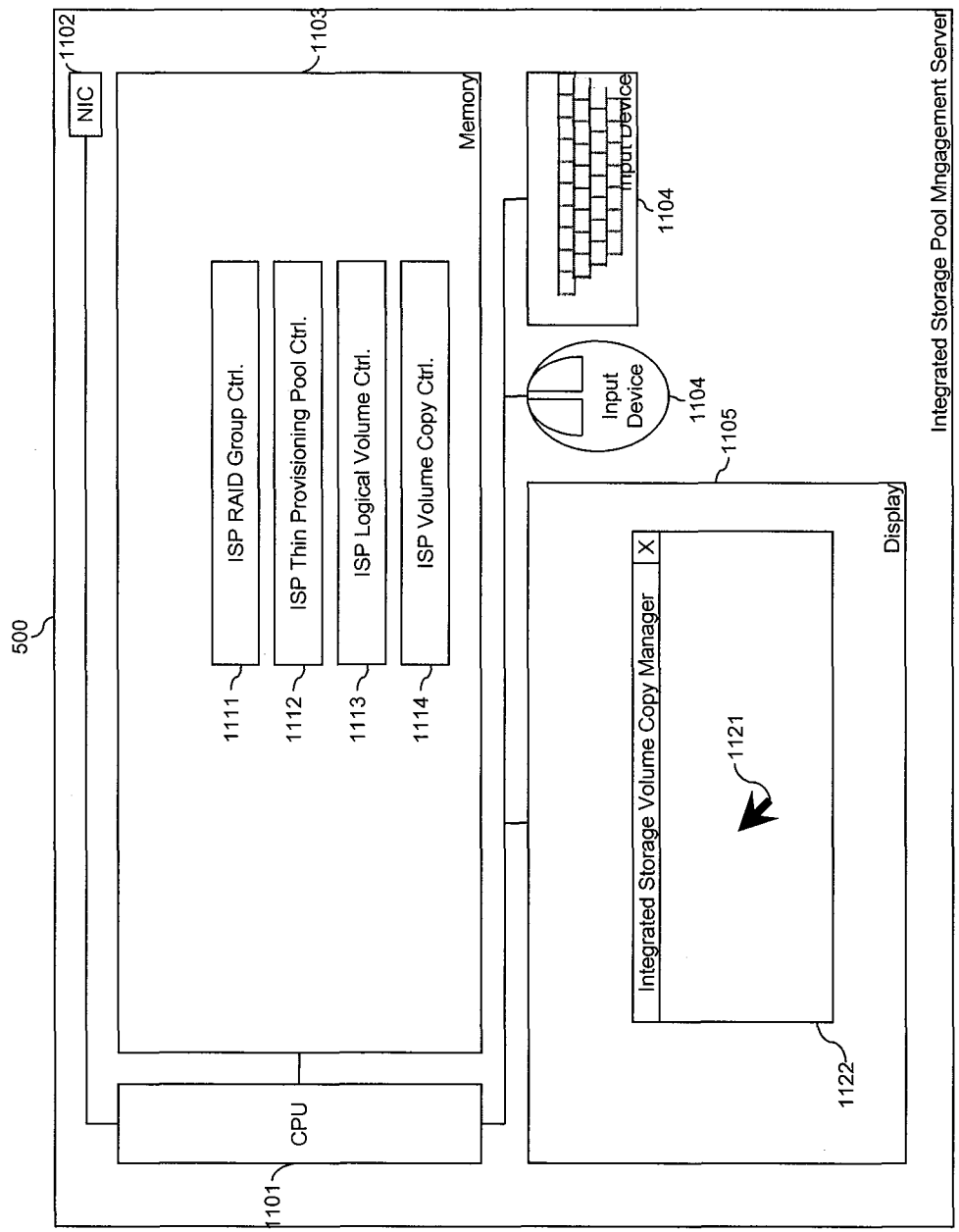
FIG. 11 shows an example of the configuration of the Thin Provisioning Pool Management Server.

FIG. 11 shows an example of the configuration of the Thin Provisioning Pool Management Server 500. The server 500 has a CPU 1101, a NIC 1102, a memory 1103, one or more input devices 1104, and a display 1105. The memory stores an ISP RAID Group Control 1111 (see FIG. 6, conventional method), an ISP Thin Provisioning Pool Control 1112 (see FIG. 7, conventional method), an ISP Logical Volume Control 1113 (see FIG. 8, conventional method), and an ISP Volume Copy Control 1114, which receives input from an Integrated Storage Volume Copy Manager GUI 1122 and sends volume copy configuration command to the command receive module 531 (see FIG. 5).

FIG. 12 shows an example of the configuration of the Integrated Storage Pool Volume Copy Manager 1122. The manager 1122 provides input and output interfaces for the user. The manager 1122 has a Volume Copy Panel 1201 (see FIG. 9 and FIGS. 13-16). It is enough to input only one column of RG, Ratio, and I/O performance which is selected above. The manager 1122 further includes a RAID Group Panel 1202 (see FIG. 6), a Thin Provisioning Panel 1203 (see FIG. 7), and a Logical Volume Panel 1204 (see FIG. 8).

Figure 13:
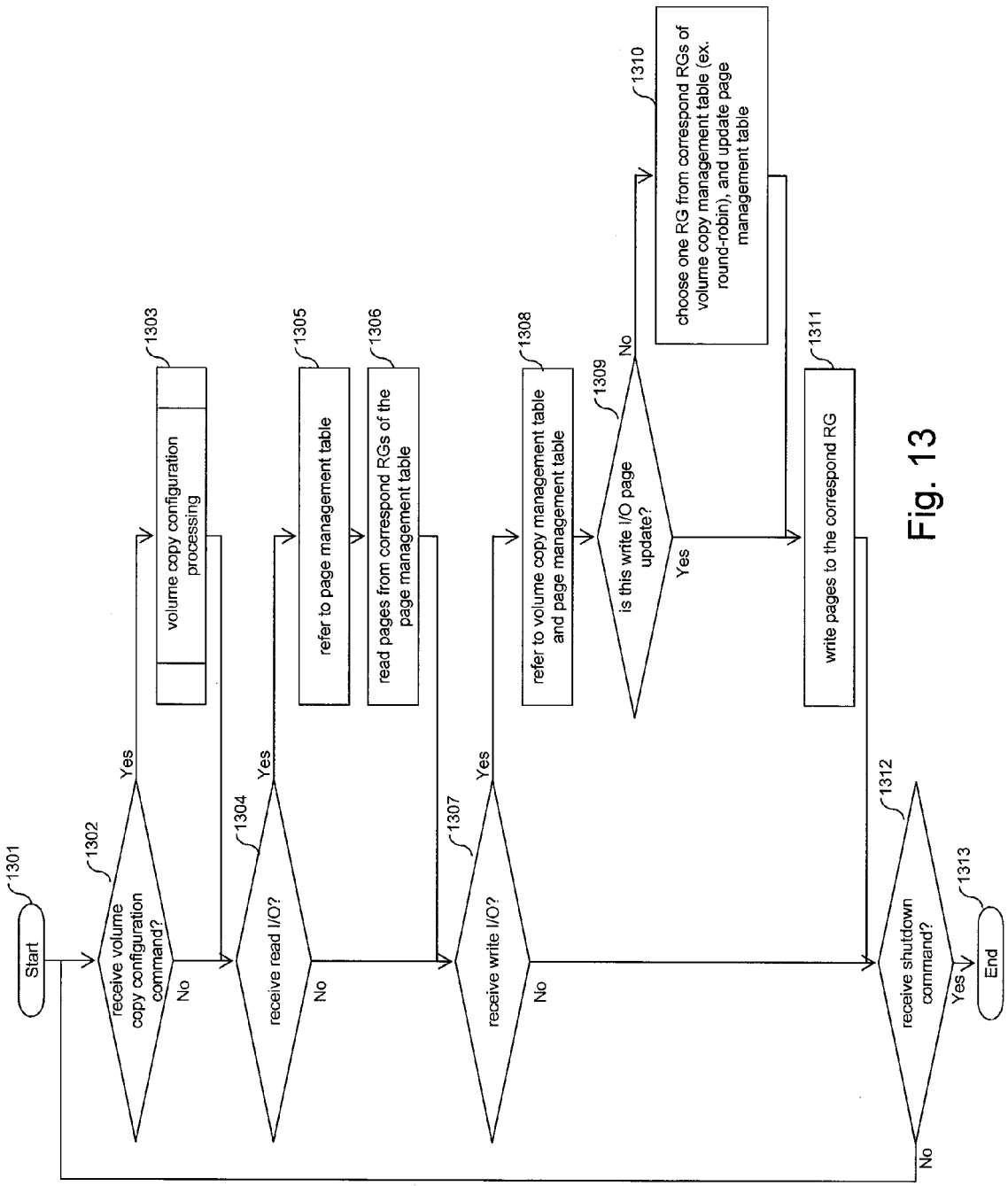
FIG. 13 shows an example of a flow diagram illustrating the main process of command receive according to the first embodiment.

FIG. 13 shows an example of a flow diagram illustrating the main process of command receive according to the first embodiment (see FIG. 3 and command receive module 531 of FIG. 5). The process starts at step 1301, when volume copy configuration is set in Volume Copy Panel 1201. In step 1302, the program determines whether the storage subsystem has received any volume copy configuration command. If yes, the program performs volume copy configuration processing (see FIG. 14) in step 1303. In step 1304, the program determines whether the storage subsystem has received any read I/O. If yes, the program refers to the page management table 540 in step 1305 and reads pages from the corresponding RGs of the page management table 540 in step 1306. In step 1307, the program determines whether the storage subsystem has received any write I/O. If yes, the program proceeds to steps 1308 to 1311. In step 1308, the program refers to the volume copy management table 539 and the page management table 540. In step 1309, the program decides whether the write I/O page is updated by determining whether there already exists a corresponding row in the page management table 540. If yes, the program skips step 1310. If no (step 1310), the program chooses one RG from the corresponding RGs of the volume copy management table 539 (e.g., round-robin), and updates the page management table 540. For example, PVOL #1 uses RG #1-5. Thus, the first page is allocated to page #10 of RG #1, and the next page is allocated to page #20 of RG #2, and so on (see FIG. 10, round-robin case). In step 1311, the program writes pages to the corresponding RG. In step 1312, the program determines whether the storage subsystem has received a shutdown command. If yes, the program ends at step 1313. If no, the program returns to step 1302.

Figure 14:
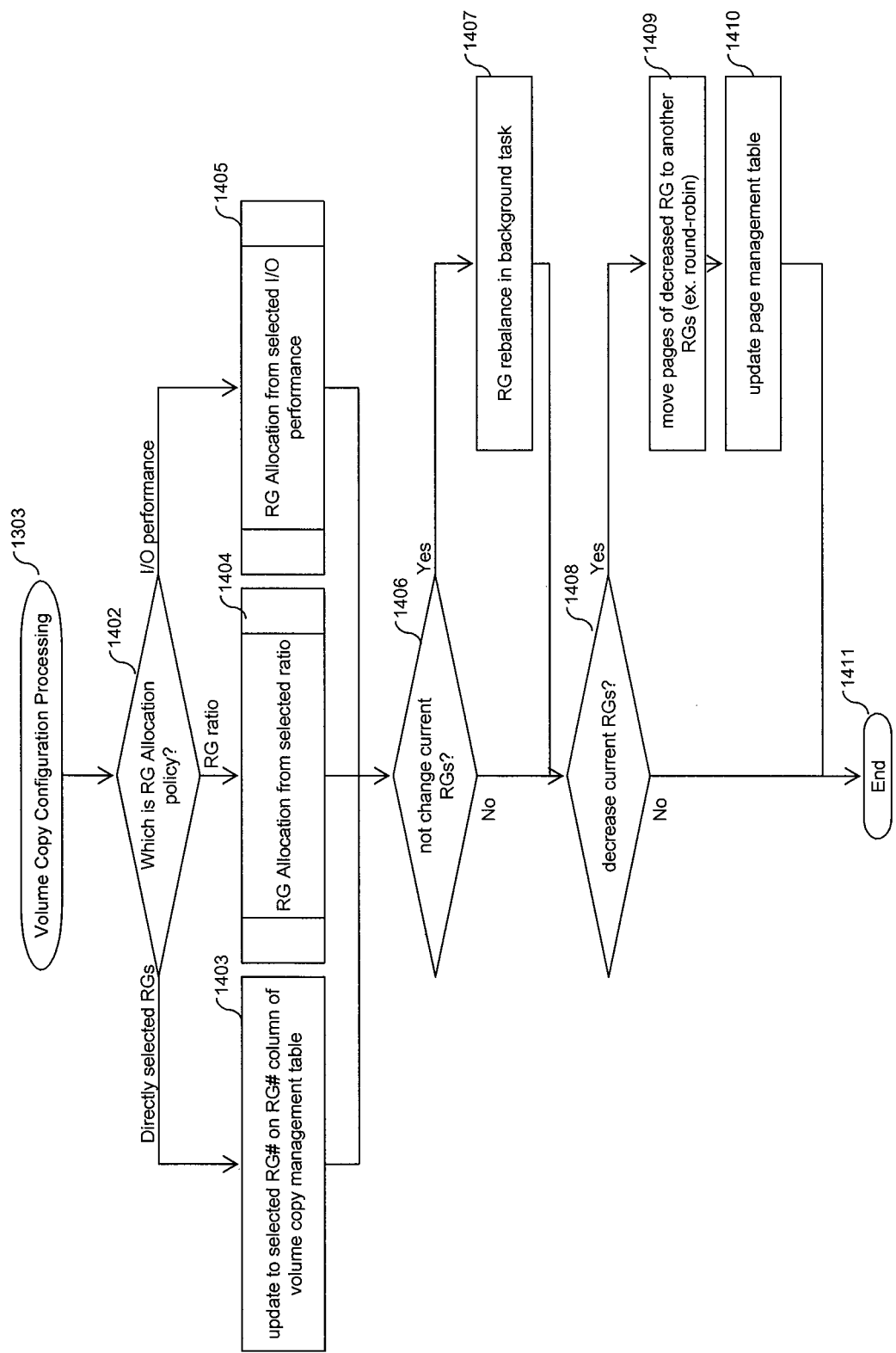
FIG. 14 shows an example of a flow diagram illustrating volume copy configuration processing in FIG. 13.

FIG. 14 shows an example of a flow diagram illustrating volume copy configuration processing (see FIG. 4, volume copy control module 533 of FIG. 5, and step 1303 of FIG. 13). In step 1402, the program determines which information in the Volume Copy Panel 1201 is the input (directly selected RG or RG ratio or I/O performance) If the input is directly selected RGs, the program provides update to the selected RG # on the RG # column of the volume copy management table 539 in step 1403. That is, the Volume Copy Management Table 540 is updated by the information in the Volume Copy Panel 1201. For example, PVOL #6: RG #1-5; SVOL #7: RG #1-3; SVLO #8: RG #4-5; and SVOL #9: RG #6-8. If the input is RG ratio, the program performs RG allocation from the selected ratio in step 1404. If the input is I/O performance, the program performs RG allocation from the selected I/O performance in step 1405. In step 1406, the program determines whether update to RGs of PVOL/SVOL is not changed from previous setting or is just increasing RGs by updating the volume copy management table 540 or not (e.g., RG #1-3->RG #1-3 or RG #1-3->RG #1-4. It is NOT the above case that RG #1-3->RG #2-4). If yes, the allocated pages are rebalanced at background task in step 1407. In step 1408, the program determines whether update to RGs of PVOL/SVOL is decreasing from previous setting by updating the volume copy management table 540 or not (e.g., RG #1-3->RG #1-2 or RG #1-3->RG #2-4). If yes, the program proceeds to steps 1409 and 1410. In step 1409, allocated pages are moved to other RGs (e.g., round-robin). Moved pages can be allocated to any RGs for corresponding logical volume (e.g., moved pages are allocated to RGs by using round-robin method, moved pages are allocated to increased RGs, etc.). In step 1410, the Page Management Table 540 is updated. The program ends at step 1411.

Figure 15:
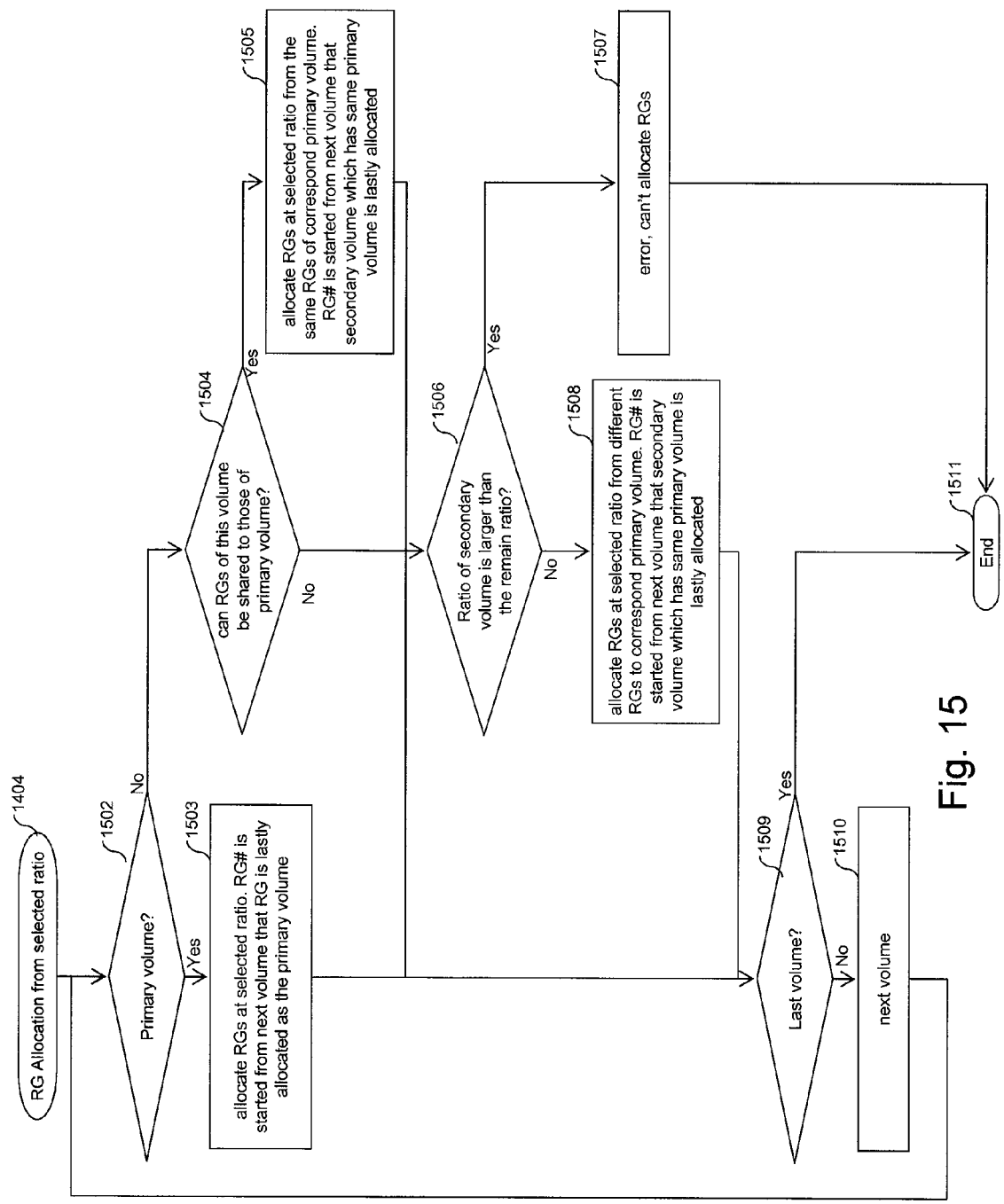
FIG. 15 shows an example of a flow diagram illustrating RG Allocation from the selected ratio in FIG. 14.

FIG. 15 shows an example of a flow diagram illustrating RG Allocation from the selected ratio (see step 1404 of FIG. 14). In step 1502, the program determines whether a volume in the Volume Copy Panel 1201 is a PVOL or not. For example, in the Volume Copy Panel 1201 shown in FIG. 12, PVOL #6 is firstly selected. In that case, the result of the determination in step 1502 is yes. If yes, the program proceeds to step 1503 and then to step 1509. If no, the program proceeds to step 1504. In step 1503, the program allocates RGs at the selected ratio. The RG # is started from the next volume that the RG is lastly allocated as the PVOL. For example, in the Volume Copy Panel 1201 shown in FIG. 12, the ratio of PVOL #6 is 62.5%. Then the total volume of Volume Pool #1 is 8 (RG #1-8). As a result, 8*0.625=5 RGs are therefore allocated (RG #1-5). In step 1504, the program determines whether share check box of the SVOL is chosen in the Volume Copy Panel 1201 or not (Can RGs of this volume be shared with those of PVOL?). For example, in the check box of SVOL #7, yes is chosen, while in the check box of SVOL #9, no is chosen. If yes, the program proceeds to step 1505 and then step 1509. If no, the program proceeds to step 1506. In step 1505, the program allocates RGs at the selected ratio from the same RGs of the corresponding PVOL. The RG # is started from the next volume that a SVOL which has the same corresponding PVOL is lastly allocated. For example, the RGs for SVOL #7 are allocated to the same RGs for PVOL #6 (RG #1-5). Then the total volume of Volume Pool #1 is 8 (RG #1-8). As a result, 8*0.375=3 RGs are therefore allocated (RG #1-3). In the same manner, RGs for SVOL #8 are allocated to RG #4-5 (because RG # starts from RG #4 which is the next number).

In step 1506, the program determines whether the ratio of SVOL is larger than the remainder ratio (of remaining unallocated RGs). For example, in FIG. 12, if the ratio of PVOL #6 is 62.5% and the ratio of SVOL #9 is 50% (not checked in shared column), yes is chosen in step 1506. If yes, the program indicates an error as it cannot allocate RGs in step 1507 and then ends at step 1511. If no, the program proceeds to step 1508 and allocates RGs at the selected ratio from different RGs to the corresponding PVOL. The RG # is started from the next volume that a SVOL which has the same corresponding PVOL is lastly allocated. For example, the RGs for SVOL #9 are allocated to different RGs for PVOL #6 (RG #6-8). Then the total volume of Volume Pool #1 is 8 (RG #1-8). As a result, 8*0.375=3 RGs are therefore allocated (RG #6-8). The program then proceeds to step 1509. In step 1509, the program determines whether it has processed the last volume. If yes, the program ends at step 1511. If no, the program proceeds with the next volume at step 1510 and returns to step 1502.

Figure 16:
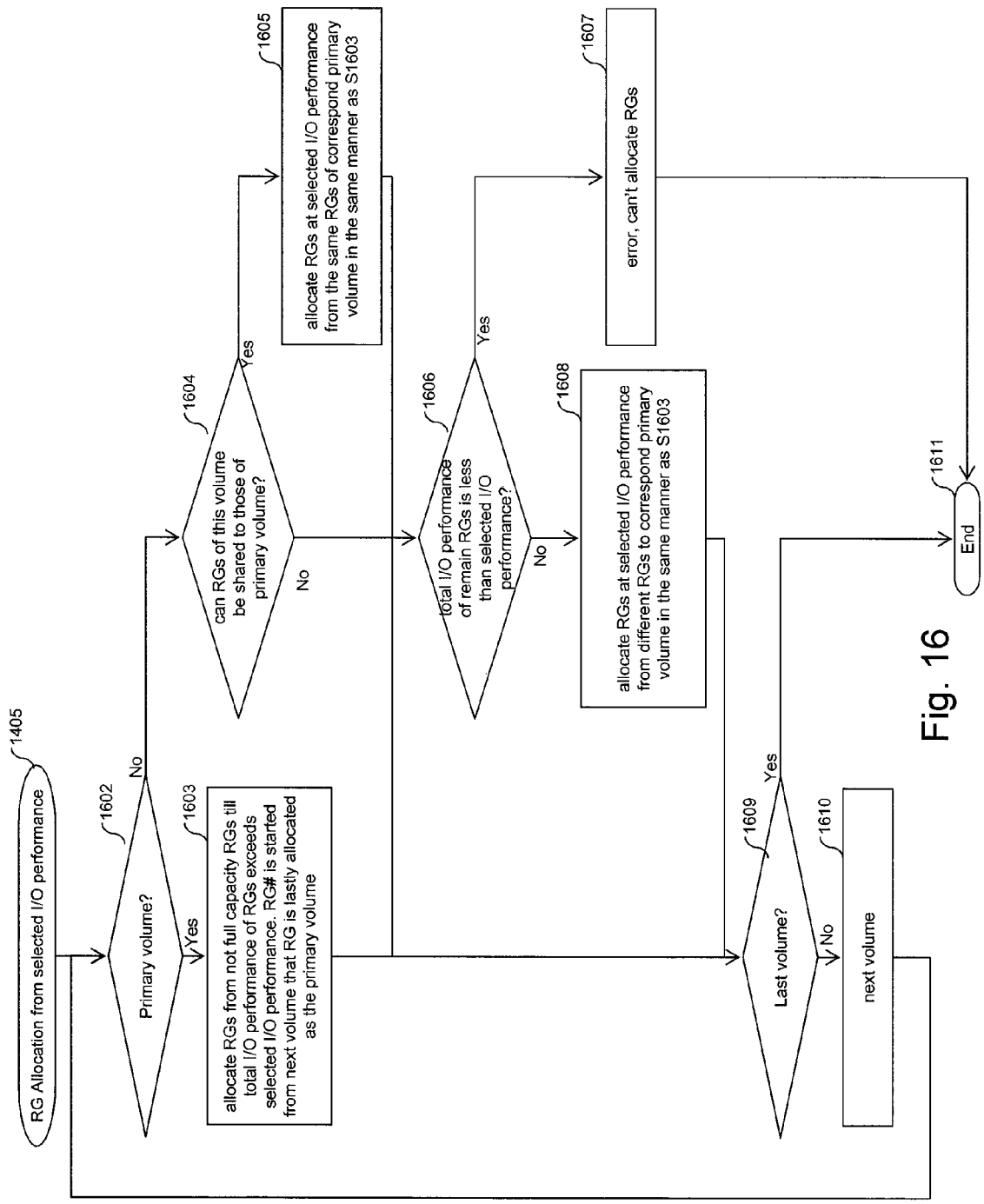
FIG. 16 shows an example of a flow diagram illustrating RG Allocation from the selected I/O performance in FIG. 14.

FIG. 16 shows an example of a flow diagram illustrating RG Allocation from the selected I/O performance (see step 1405 of FIG. 14). FIG. 16 is similar to FIG. 15. In step 1602, the program determines whether a volume in the Volume Copy Panel 1201 is a PVOL or not. If yes, the program proceeds to step 1603 and then to step 1609. If no, the program proceeds to step 1604. In step 1603, the program allocates RGs from not full capacity RGs until the total I/O performance of RGs exceeds the selected I/O performance. The RG # is started from the next volume that the RG is lastly allocated as the PVOL. For example, in the Volume Copy Panel 1201 shown in FIG. 12, the I/O performance of PVOL #6 is 3200 MB/s. Because the total performance of RG #1-5 is 3200 MB/s, RG #1-5 are therefore allocated. In step 1604, the program determines whether share check box of the SVOL is chosen in the Volume Copy Panel 1201 or not. If yes, the program proceeds to step 1605 and then step 1609. If no, the program proceeds to step 1606. In step 1605, the program allocates RGs at the selected I/O performance from the same RGs of the corresponding PVOL in the same manner as step 1603.

In step 1606, the program determines whether the total I/O performance of the remaining RGs is less than the selected I/O performance. For example, in FIG. 12, if the I/O performance of PVOL #6 is 3200 MB/s and the I/O performance of SVOL #9 is 1000 MB/s, 1000 MB/s exceeds the total I/O performance of the remaining RGs (RG #6-8, 800 MB/s). Thus, yes is chosen at step 1606. If yes, the program identifies an error as it cannot allocate RGs in step 1607 and then ends at step 1611. If no, the program proceeds to step 1608 and allocates RGs at the selected I/O performance from different RGs to the corresponding PVOL in the same manner as step 1603. The program then proceeds to step 1609. In step 1609, the program determines whether it has processed the last volume. If yes, the program ends at step 1611. If no, the program proceeds with the next volume at step 1610 and returns to step 1602.

Second Embodiment

While the first embodiment involves whole volume copy (e.g., Shadow Image), the second embodiment involves copy-on-write snapshot.

Figure 17:
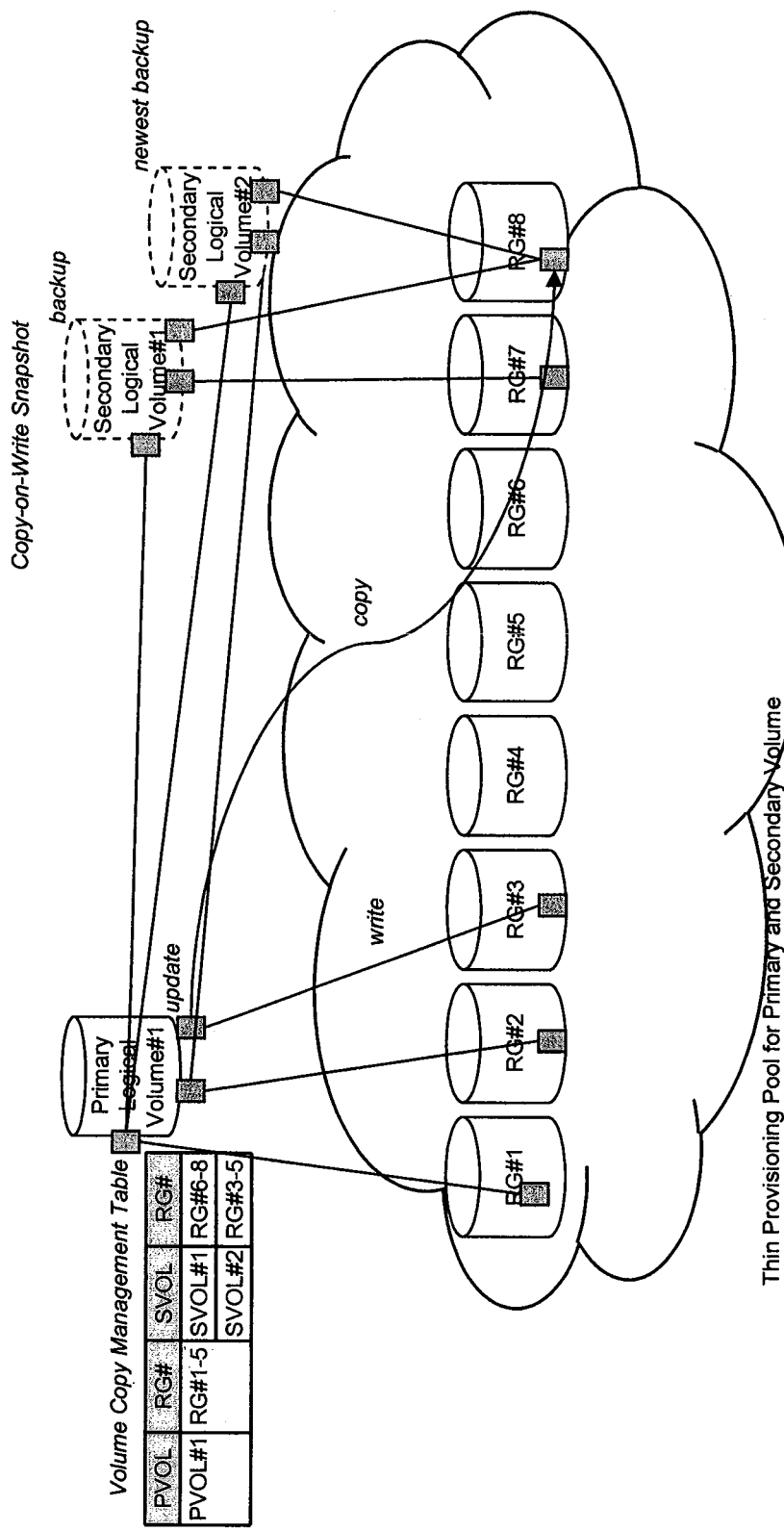
FIG. 17 shows an example of a thin provisioning pool for PVOLs and SVOLs and a volume copy management table for managing copy-on-write snapshot according to the second embodiment.

FIG. 17 shows an example of a thin provisioning pool for PVOLs and SVOLs and a volume copy management table for managing copy-on-write snapshot according to the second embodiment. As discussed above in connection with the first embodiment, the volume copy management table is used to manage RAID groups whereby each logical volume can write pages. When pages of the PVOL are updated, the pages are written to RGs for the SVOL. At that time, copied pages for SVOLs are written to different RAID groups from those for the PVOL. Copied pages of SVOLs which have the same PVOL are shared.

FIG. 18 shows an example of a Volume Copy Management Table 539 according to the second embodiment. In the case of copy-on-write snapshot, SVOLs which correspond to the same PVOL are allocated the same RGs. For example, SVOL #4-5 are allocated to RG #1-3 and SVOL #7-9 are allocated to RG #6-8. The table has columns of PVOL Volume #1801, PVOL RG #1802, SVOL Volume #1803, SVOL RG #1804, and Attribute 1805.

FIG. 19 shows an example of a Page Management Table 540 according to the second embodiment. The virtual volume #1901 and LBA 1902 columns are the same as in the first embodiment of FIG. 10. The RAID Group #1903 for SVOL can be either PVOL # or RAID Group # as in the first embodiment. The Page # column 1004 in the first embodiment of FIG. 10 is changed to PVOL LBA/Page # column 1904 in FIG. 19. In the case of copy-on-write snapshot, pages of SVOL point to corresponding pages of PVOL firstly. For example, LBA 1000-1099 of SVOL #2 just point to LBA 0-99 of PVOL #1, that is, page #10 of RG #1. LBA 1200-1299 of SVOL #2 are allocated to page #130 of RG #8.

Figure 20:
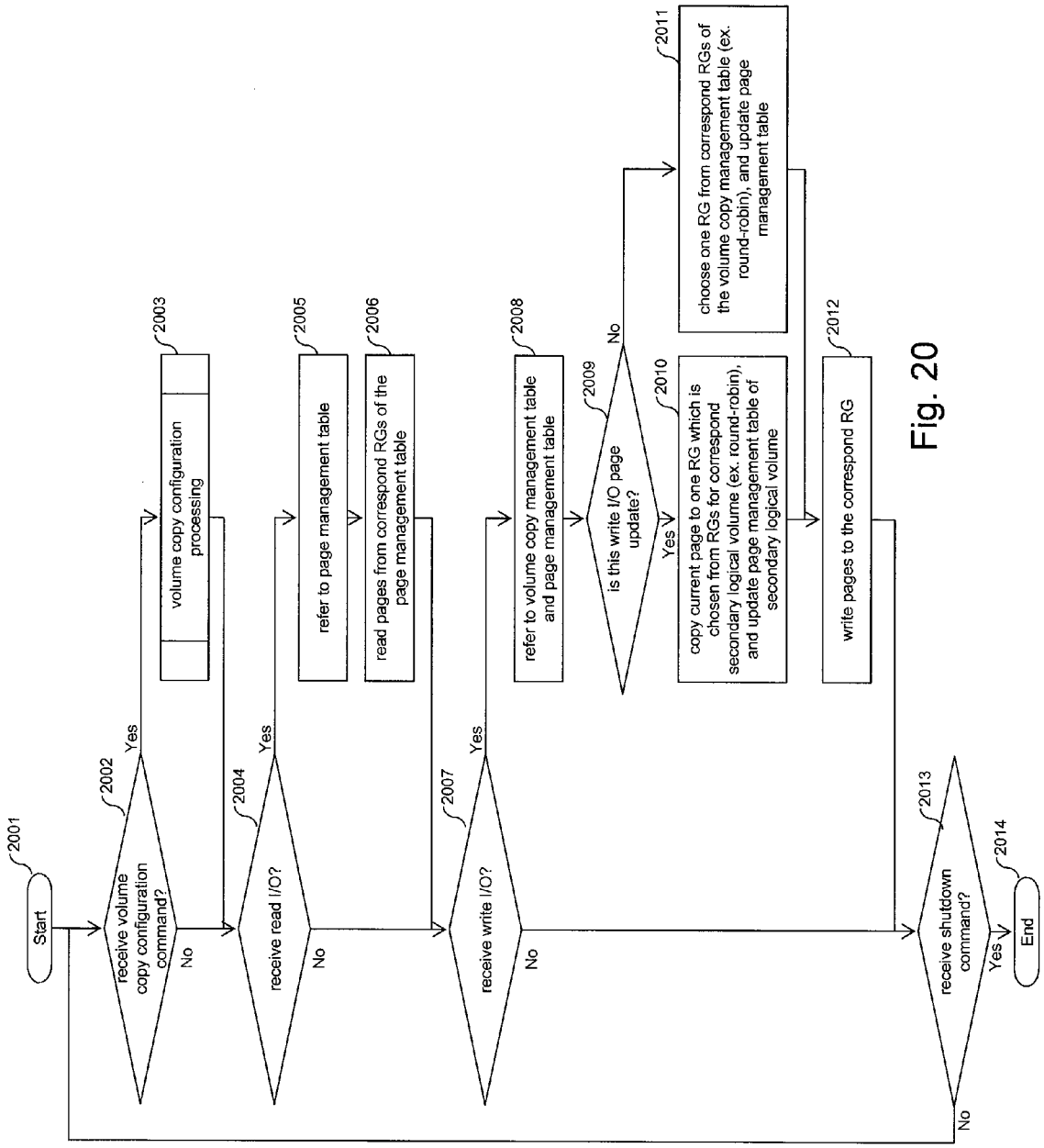
FIG. 20 shows an example of a flow diagram illustrating the main process of command receive according to the second embodiment.

FIG. 20 shows an example of a flow diagram illustrating the main process of command receive according to the second embodiment (see FIG. 17 and command receive module 531 of FIG. 5). Steps 2001-2009 are the same as steps 1301-1309 of the first embodiment shown in FIG. 13. In step 2010, the program copies the current page to one RG which is chosen from RGs for the corresponding SVOL (e.g., round-robin), and updates the page management table of the SVOL. For example, (2 (SVOL), 1200-1299, PVOL #1, 200-299) is updated to (2 (SVOL), 1200-1299, 8, 130). Steps 2011-2014 are the same as steps 1310-1313 shown in FIG. 13.

Third Embodiment

In the second embodiment, copied pages of SVOLs which have the same PVOL are shared. If one RG fails, all corresponding SVOLs fail. Moreover, because locking within SVOLs is a heavy task, it may be slow to read SVOL. Some SVOLs are therefore allocated to different RGs of other SVOLs. In the third embodiment, SVOLs which have the same PVOL can have multiple copied pages.

Figure 21:
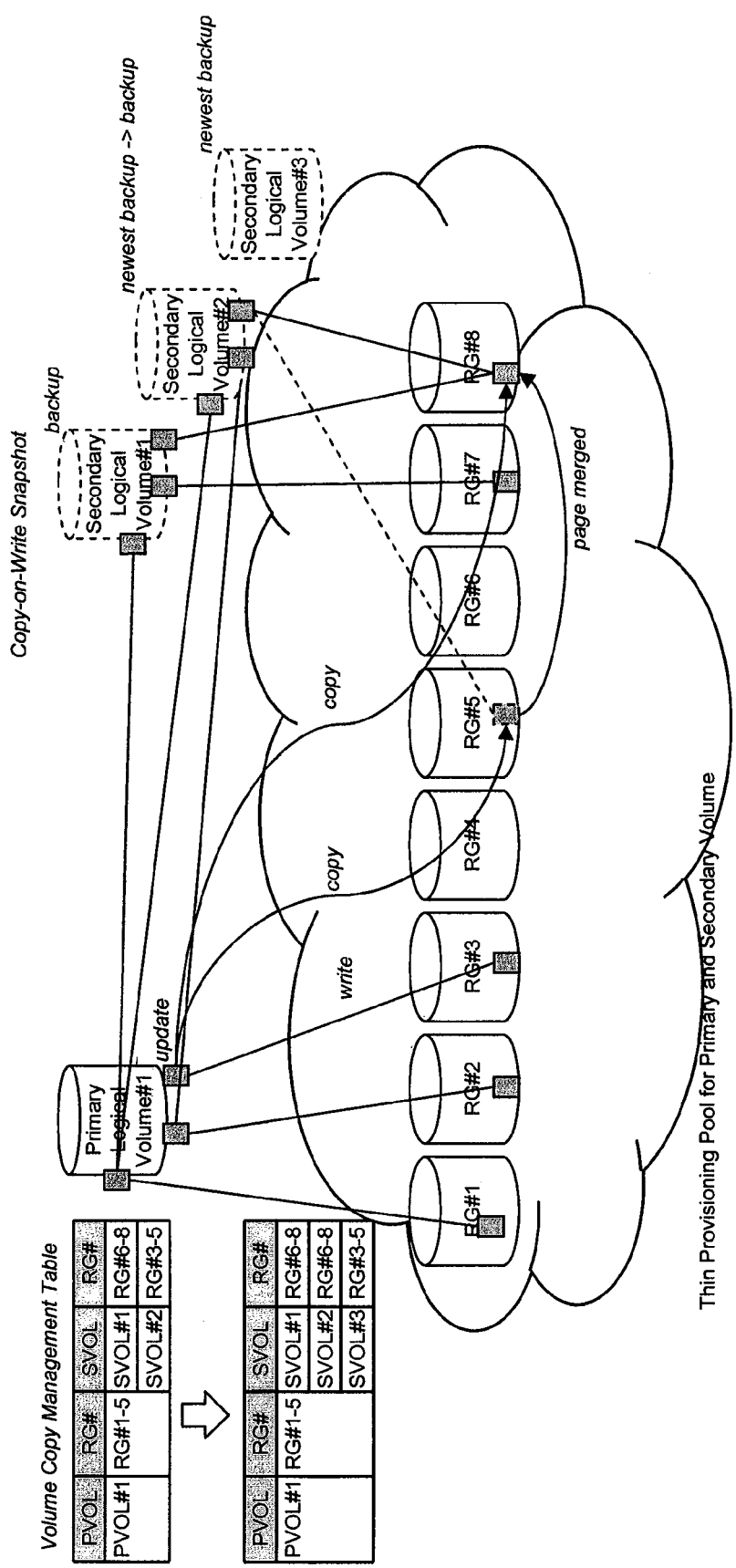
FIG. 21 shows an example of a thin provisioning pool for PVOLs and SVOLs and a volume copy management table for managing copy-on-write snapshot according to the third embodiment.

FIG. 21 shows an example of a thin provisioning pool for PVOLs and SVOLs and a volume copy management table for managing copy-on-write snapshot according to the third embodiment. When pages of PVOL are updated, multiple copied pages are written to RGs for SVOL. When the newest backup SVOL is allocated to different RGs of other SVOLs, the dedicated SVOL can be merged to other SVOLs copied pages.

FIG. 22 shows an example of a Volume Copy Management Table 539 according to the third embodiment. FIG. 22 is similar to FIG. 18, and the information is input by the GUI shown in FIG. 12. The table has columns of PVOL Volume #2201, PVOL RG #2202, SVOL Volume #2203, SVOL RG #2204, and Attribute 2205.

FIG. 23 shows an example of a Page Management Table 540 according to the third embodiment. FIG. 23 is similar to FIG. 19. The table has columns of virtual volume #2301, LBA 2302, PVOL # or RAID Group #2303, and PVOL LBA/Page # column 2304. For example, PVOL #3 has multiple SVOLs (SVOL #4 and SVOL #5). When (3 (PVOL), 200-299, 7, 30) is updated, the current page is copied to RG #2 and RG #5. Then the Page Management Table 540 is updated: (4 (SVOL), 1200-1299, PVOL, 200-299)->(4 (SVOL), 1200-1299, 2, 130). (5 (SVOL), 2200-2299, PVOL, 200-299)->(5 (SVOL), 2200-2299, 5, 230).

Figure 24:
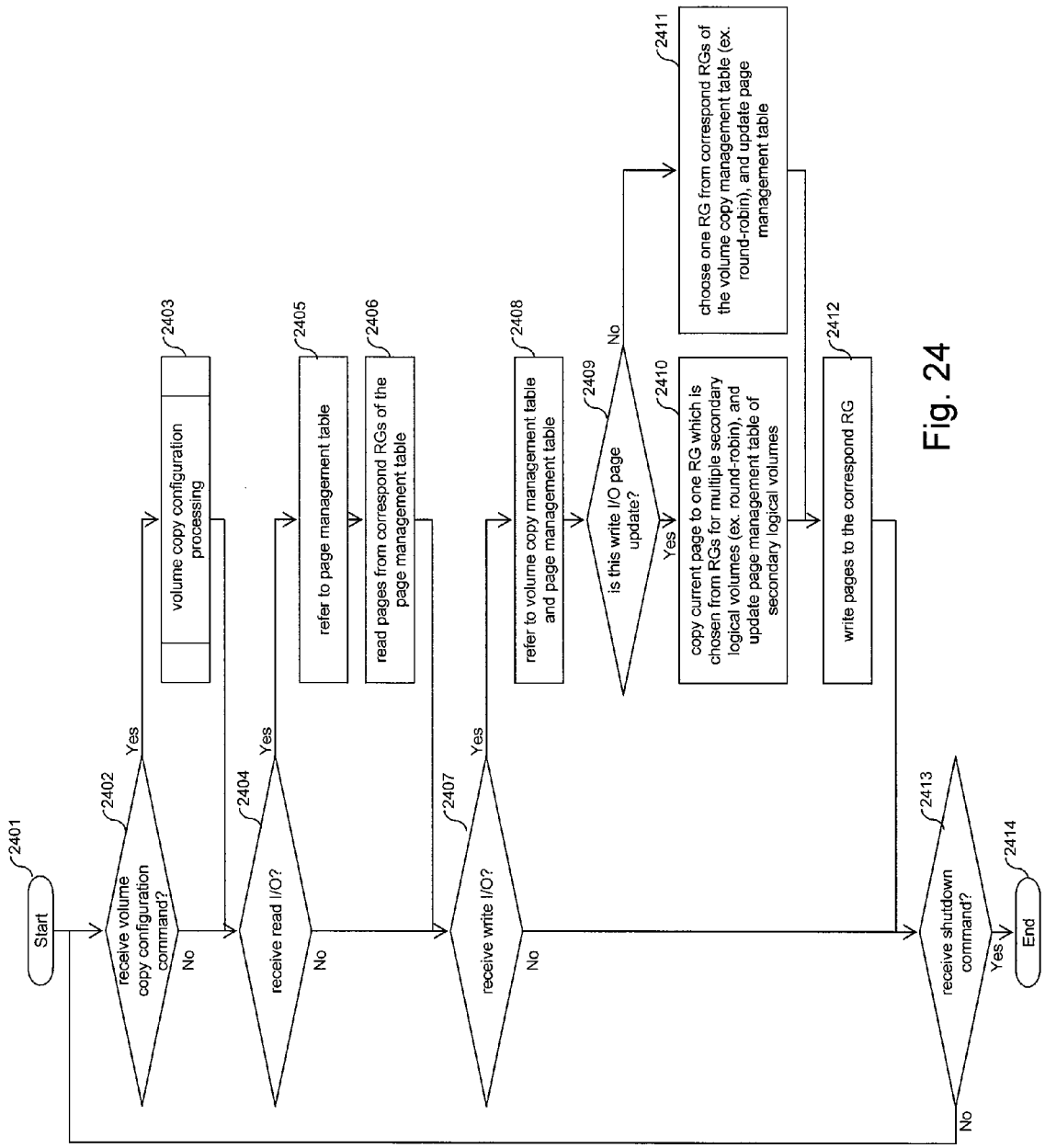
FIG. 24 shows an example of a flow diagram illustrating the main process of command receive according to the third embodiment.

FIG. 24 shows an example of a flow diagram illustrating the main process of command receive according to the third embodiment (see FIG. 21 and command receive module 531 of FIG. 5). FIG. 24 is the same as FIG. 20 except that step 2410 is different from step 2010. In step 2410, multiple copied pages are written to RGs for SVOLs.

Figure 25A:
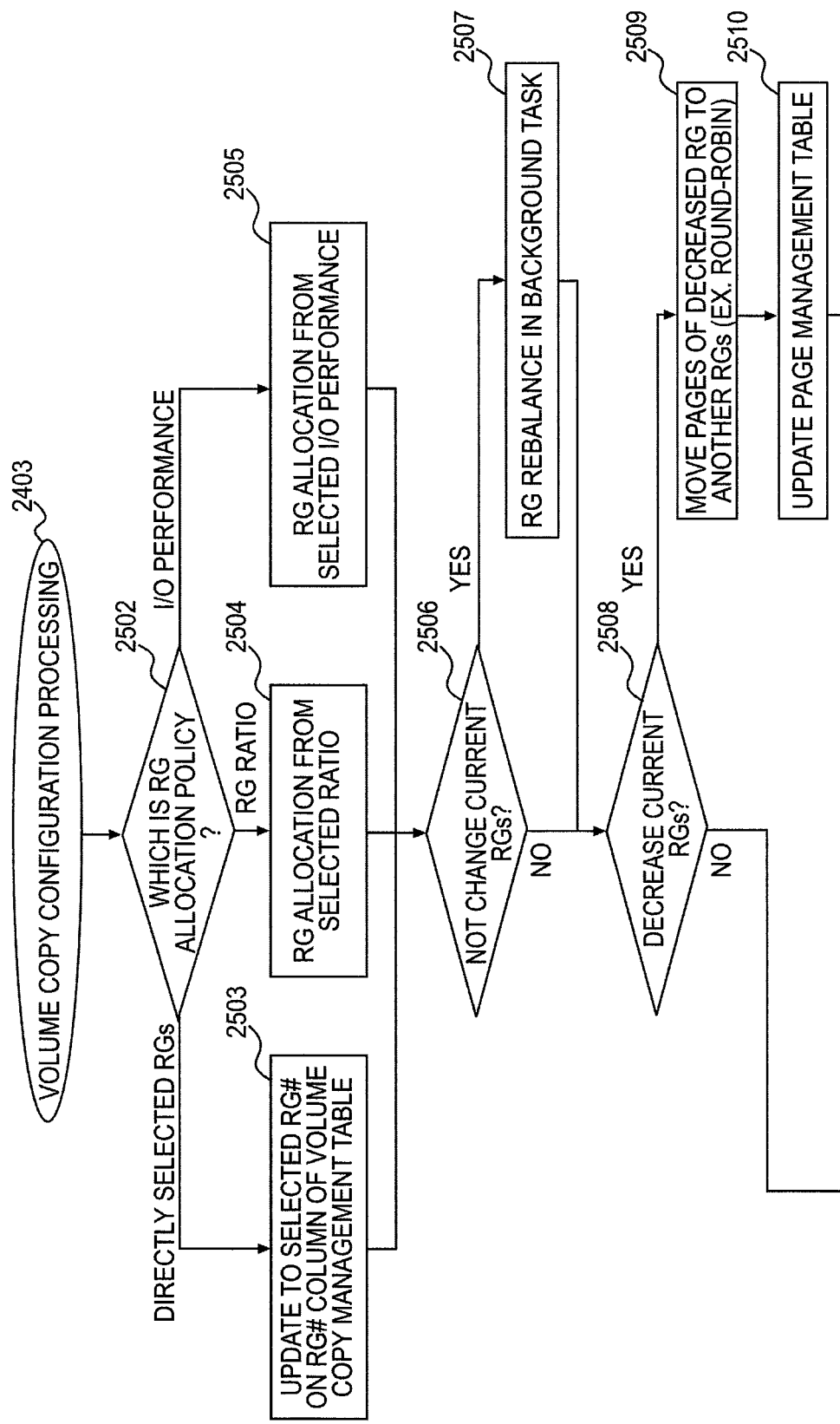
FIG. 25 shows an example of a flow diagram illustrating volume copy configuration processing in FIG. 24.
Figure 25B:
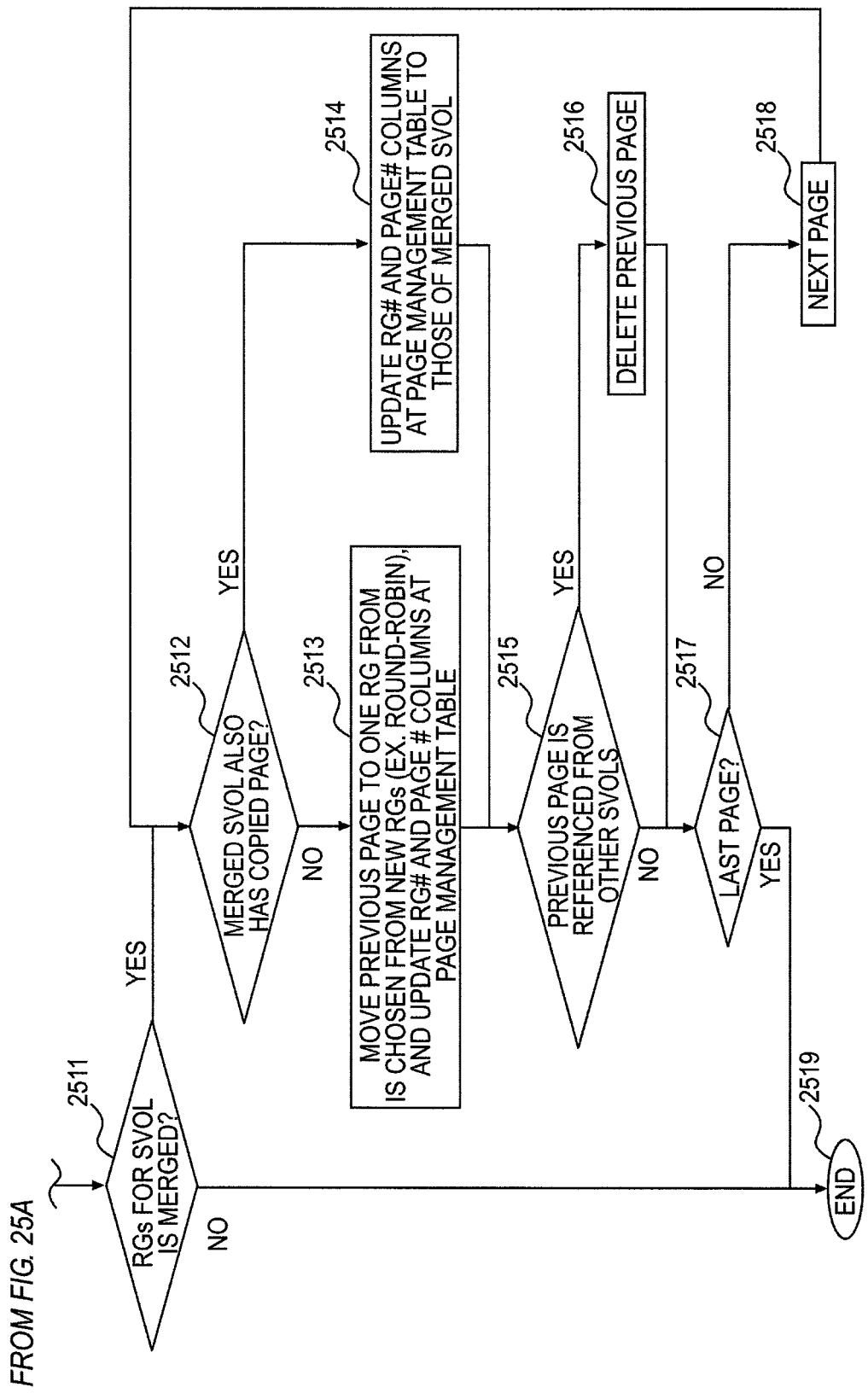

FIG. 25 shows an example of a flow diagram illustrating volume copy configuration processing in FIG. 24 (see FIG. 21, volume copy control module 533 of FIG. 5, and step 2403 of FIG. 24). Steps 2502-2510 are the same as steps 1402-1410 of the first embodiment shown in FIG. 14. In step 2511, the program determines whether the RG for SVOL is merged or not. If no, the program ends at step 2519. If yes, the program proceeds to step 2512. For example, in the volume copy management table 539 shown in FIG. 21, the row (PVOL #1, RG #1-5, SVOL #2, RG #3-5) is changed to (PVOL #1, RG #1-5, SVOL #2, RG #6-8). As a result, the RG for SVOL #1 and the RG for SVOL #2 are merged. In step 2512, the program determines whether the merged SVOL also has copied page or not. If no, the program proceeds to step 2513. If yes, the program proceeds to step 2514. For example, the program assumes SVOL #4 is merged to SVOL #5. SVOL #5 does not have the copied page which corresponds to (4, 1100-1199, 1, 120) of SVOL #4 because the corresponding page of SVOL #5 (5, 2100-2199, PVOL #1, 100-199) is just pointing to the PVOL's page. On the other hand, SVOL #5 has the copied page which corresponds to (4, 1200-1299, 2, 130) of SVOL #4 because SVOL #5 has the corresponding page (5, 2200-2299, 5, 230).

In step 2513, the program moves the previous page to one RG which is chosen from new RGs (e.g., round-robin), and updates the RG # and page # columns of the page management table 540. In the above example, SVOL #5 does not have the copied page which corresponds to (4, 1100-1199, 1, 120) of SVOL #4 because the corresponding page of SVOL #5 (5, 2100-2199, PVOL #1, 100-199) is just pointing to the PVOL's page. The program moves (4, 1100-1199, 1, 120) to RG #6 (because a page is allocated to RG #5, the next RG, that is, RG #6, is allocated by round-robin). Then (4, 1100-1199, 1, 120) in the page management table 540 is updated to (4, 1100-1199, 6, 340), for example. In step 2514, the program updates the RG # and page # columns of the page management table 540 to those of the merged SVOL. In the above example, SVOL #5 has the copied page which corresponds to (4, 1200-1299, 2, 130) of SVOL #4 because SVOL #5 has the corresponding page (5, 2200-2299, 5, 230). (4, 1200-1299, 2, 130) in the page management table 540 is updated to (4, 1200-1299, 5, 230).

In step 2515, the program determines whether the previous page is referenced from other SVOLs or not. If no, the program skips step 2516. If yes, the program deletes the previous page in step 2516. In the above example, SVOL #5 does not have the copied page which corresponds to (4, 1100-1199, 1, 120) of SVOL #4 because the corresponding page of SVOL #5 (5, 2100-2199, PVOL #1, 100-199) is just pointing to the PVOL's page. (4, 1100-1199, 1, 120) is not referred to from other SVOLs. The page of RG #1 is therefore deleted. In step 2517, the program determines whether it has processed the last page. If yes, the program ends at step 2519. If no, the program proceeds to the next page at step 2518 and returns to step 2512.

Of course, the system configuration illustrated in FIG. 5 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for integrated thin provisioning pool for primary logical volume and secondary logical volume in a storage subsystem. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
a processor;
a memory; and
a storage controller configured to allocate storage area from a first pool in response to a write request, and to control allocation of storage area for a plurality of related data, which are to be allocated from the first pool, from specified Redundant Array of Inexpensive Disk (RAID) groups in the first pool;
wherein the plurality of related data comprise data stored in a primary volume and data stored one or more corresponding secondary volumes, wherein the storage controller comprises:
a command receive module configured to determine whether the storage system has received a volume copy configuration command; and
a disk Input/Output (I/O) execution module which, if the storage system has not received a volume copy configuration command,
determines whether the storage system has received a read I/O and, if yes, refers to a page management table and read pages from corresponding RAID groups from the page management table, wherein the page management table includes for each primary volume, a virtual volume number, a logical block address, a RAID group number, and a page number, and for each secondary volume, a virtual volume number, a logical block address, a RAID group number, and a page number;
determines whether the storage system has received a write I/O and, if yes, refers to a volume copy management table and the page management table and decides whether a write I/O page is updated by determining whether there already exists a corresponding entry for the write I/O page in the page management table and, if no, chooses one RAID group from the corresponding RAID groups of the primary volume in the volume copy management table and updates the page management table, and then regardless of whether there already exists a corresponding entry in the page management table, writes pages to the chosen RAID group, wherein the volume copy management table includes for each primary volume, a primary volume number, RAID group numbers for the primary volume, secondary volume numbers of corresponding one or more secondary volumes, and RAID groups numbers for the corresponding one or more secondary volumes.

2. The storage system according to claim 1, wherein the storage controller comprises:
a volume copy control module which, if the storage system has received a volume copy configuration command, determines whether a volume copy control input is directly selected RAID groups or RAID group ratio or I/O performance,
wherein if the volume copy control input is directly selected RAID groups, the volume copy control module provides update to RAID group numbers of the selected RAID groups in the volume copy management table,
wherein if the volume copy control input is RAID group ratio, the volume copy control module performs RAID group allocation from the selected ratio,
wherein if the volume copy control input is I/O performance, the volume copy control module performs RAID group allocation from the selected I/O performance, and
wherein the volume copy control input further comprises, for the primary volume, primary volume number, RAID group numbers, RAID group ratio, and I/O performance, and for each of the one or more corresponding secondary volumes, secondary volume number, RAID group numbers, RAID group ratio, I/O performance, and an indication as to whether the secondary volume can share RAID groups with the primary volume.

3. The storage system according to claim 2, wherein the volume copy control module is configured to:
determine whether update to RAID groups of the primary volume and one or more secondary volumes for storing the related data is changed from a previous setting and, if yes, allocated pages are rebalanced at background task; and
determine whether update to RAID groups of the primary volume and one or more secondary volumes for storing the related data is decreasing from a previous setting and, if yes, allocated pages are moved to other RAID groups and the page management table is updated.

4. The storage system according to claim 2, wherein performing RAID group allocation from the selected ratio by the volume copy control module comprises:
for the primary volume in the volume copy control input, allocating RAID groups at the selected ratio, wherein the RAID group number is started from a next volume that a RAID group is lastly allocated as the primary volume; and
for each secondary volume in the volume copy control input,
if the secondary volume can share RAID groups with the primary volume, allocating RAID groups at the selected ratio from the same RAID groups of the corresponding primary volume, wherein the RAID group number is started from a next volume that a secondary volume which has the same corresponding primary volume is lastly allocated; and
determining whether the ratio of the secondary volume is larger than a remainder ratio of remaining unallocated RAID groups, and if yes, indicating an error in allocating RAID groups, and if no, allocating RAID groups at the selected ratio from different RAID groups from those allocated to the corresponding primary volume, wherein the RAID group number is started from a next volume that a secondary volume which has the same corresponding primary volume is lastly allocated.

5. The storage system according to claim 2, wherein performing RAID group allocation from the selected I/O performance by the volume copy control module comprises:
   for the primary volume in the volume copy control input, allocating RAID groups from not full capacity RAID groups until a total I/O performance of RAID groups exceeds the selected I/O performance, wherein the RAID group number is started from a next volume that a RAID group is lastly allocated as the primary volume; and
   for each secondary volume in the volume copy control input,
       if the secondary volume can share RAID groups with the primary volume, allocating RAID groups at the selected I/O performance from the same RAID groups of the corresponding primary volume, wherein the RAID group number is started from a next volume that a secondary volume which has the same corresponding primary volume is lastly allocated; and
       determining whether the total I/O performance of remaining unallocated RAID groups is less than the selected I/O performance, and if yes, indicating an error in allocating RAID groups, and if no, allocating RAID groups at the selected I/O performance from different RAID groups from those allocated to the corresponding primary volume, wherein the RAID group number is started from a next volume that a secondary volume which has the same corresponding primary volume is lastly allocated.

6. A storage system comprising:
   a processor;
   a memory; and
   a storage controller configured to allocate storage area from a first pool in response to a write request, and to control allocation of storage area for a plurality of related data, which are to be allocated from the first pool, from specified Redundant Array of Inexpensive Disk (RAID) groups in the first pool;
   wherein the plurality of related data comprise data stored in a primary volume and data stored one or more corresponding secondary volumes, wherein the data in the one or more corresponding secondary volumes are copy-on-write of data in the primary volume, wherein the storage controller comprises:
   a command receive module configured to determine whether the storage system has received a volume copy configuration command; and
   a disk Input/Output (I/O) execution module which, if the storage system has not received a volume copy configuration command,
       determines whether the storage system has received a read I/O and, if yes, refers to a page management table and read pages from corresponding RAID groups from the page management table, wherein the page management table includes for each primary volume, a virtual volume number, a logical block address, a RAID group number, and a page number, and for each secondary volume, a virtual volume number, a logical block address, a RAID group number, and a page number;
       determines whether the storage system has received a write I/O and, if yes, refers to a volume copy management table and the page management table and decides whether a write I/O page is updated by determining whether there already exists a corresponding entry for the write I/O page in the page management table and, if no, chooses one RAID group from the corresponding RAID groups of the primary volume in the volume copy management table and updates the page management table, and then regardless of whether there already exists a corresponding entry in the page management table, writes pages to the chosen RAID group, wherein the volume copy management table includes for each primary volume, a primary volume number, RAID group numbers for the primary volume, secondary volume numbers of corresponding one or more secondary volumes, and RAID groups numbers for the corresponding one or more secondary volumes.

7. The storage system according to claim 6, wherein the storage controller comprises:
   a volume copy control module which, if the storage system has received a volume copy configuration command, determines whether a volume copy control input is directly selected RAID groups or RAID group ratio or I/O performance,
   wherein if the volume copy control input is directly selected RAID groups, the volume copy control module provides update to RAID group numbers of the selected RAID groups in the volume copy management table,
   wherein if the volume copy control input is RAID group ratio, the volume copy control module performs RAID group allocation from the selected ratio,
   wherein if the volume copy control input is I/O performance, the volume copy control module performs RAID group allocation from the selected I/O performance, and
   wherein the volume copy control input further comprises, for the primary volume, primary volume number, RAID group numbers, RAID group ratio, and I/O performance, and for each of the one or more corresponding secondary volumes, secondary volume number, RAID group numbers, RAID group ratio, I/O performance, and an indication as to whether the secondary volume can share RAID groups with the primary volume.

8. The storage system according to claim 7, wherein the volume copy control module is configured to:
   determine whether update to RAID groups of the primary volume and one or more secondary volumes for storing the related data is changed from a previous setting and, if yes, allocated pages are rebalanced at background task; and
   determine whether update to RAID groups of the primary volume and one or more secondary volumes for storing the related data is decreasing from a previous setting and, if yes, allocated pages are moved to other RAID groups and the page management table is updated.

9. The storage system according to claim 7,
   wherein performing RAID group allocation from the selected ratio by the volume copy control module comprises:
   for the primary volume in the volume copy control input, allocating RAID groups at the selected ratio, wherein the RAID group number is started from a next volume that a RAID group is lastly allocated as the primary volume; and
   for each secondary volume in the volume copy control input,
       if the secondary volume can share RAID groups with the primary volume, allocating RAID groups at the selected ratio from the same RAID groups of the corresponding primary volume, wherein the RAID group number is started from a next volume that a secondary volume which has the same corresponding primary volume is lastly allocated; and determining whether the ratio of the secondary volume is larger than a remainder ratio of remaining unallocated RAID groups, and if yes, indicating an error in allocating RAID groups, and if no, allocating RAID groups at the selected ratio from different RAID groups from those allocated to the corresponding primary volume, wherein the RAID group number is started from a next volume that a secondary volume which has the same corresponding primary volume is lastly allocated; and wherein performing RAID group allocation from the selected I/O performance by the volume copy control module comprises:

for the primary volume in the volume copy control input, allocating RAID groups from not full capacity RAID groups until a total I/O performance of RAID groups exceeds the selected I/O performance, wherein the RAID group number is started from a next volume that a RAID group is lastly allocated as the primary volume; and for each secondary volume in the volume copy control input,
if the secondary volume can share RAID groups with the primary volume, allocating RAID groups at the selected I/O performance from the same RAID groups of the corresponding primary volume, wherein the RAID group number is started from a next volume that a secondary volume which has the same corresponding primary volume is lastly allocated; and determining whether the total I/O performance of remaining unallocated RAID groups is less than the selected I/O performance, and if yes, indicating an error in allocating RAID groups, and if no, allocating RAID groups at the selected I/O performance from different RAID groups from those allocated to the corresponding primary volume, wherein the RAID group number is started from a next volume that a secondary volume which has the same corresponding primary volume is lastly allocated.

10. A storage system comprising:
a processor;
a memory; and
a storage controller configured to allocate storage area from a first pool in response to a write request, and to control allocation of storage area for a plurality of related data, which are to be allocated from the first pool, from specified Redundant Array of Inexpensive Disk (RAID) groups in the first pool;
wherein the plurality of related data comprise data stored in a primary volume and data stored one or more corresponding secondary volumes, wherein the storage controller allocates the related data such that the plurality of secondary volumes corresponding to the same primary volume can have multiple copied pages that are not shared among the secondary volumes, wherein the storage controller comprises:
a command receive module configured to determine whether the storage system has received a volume copy configuration command; and
a disk Input/Output (I/O) execution module which, if the storage system has not received a volume copy configuration command, determines whether the storage system has received a read I/O and, if yes, refers to a page management table and read pages from corresponding RAID groups from the page management table, wherein the page management table includes for each primary volume, a virtual volume number, a logical block address, a RAID group number, and a page number, and for each secondary volume, a virtual volume number, a logical block address, a RAID group number, and a page number;

determines whether the storage system has received a write I/O and, if yes, refers to a volume copy management table and the page management table and decides whether a write I/O page is updated by determining whether there already exists a corresponding entry for the write I/O page in the page management table and, if no, chooses one RAID group from the corresponding RAID groups of the primary volume in the volume copy management table and updates the page management table, and then regardless of whether there already exists a corresponding entry in the page management table, writes pages to the chosen RAID group, wherein the volume copy management table includes for each primary volume, a primary volume number, RAID group numbers for the primary volume, secondary volume numbers of corresponding one or more secondary volumes, and RAID groups numbers for the corresponding secondary volumes.

11. The storage system according to claim 10, wherein the storage controller comprises:
a volume copy control module which, if the storage system has received a volume copy configuration command, determines whether a volume copy control input is directly selected RAID groups or RAID group ratio or I/O performance,
wherein if the volume copy control input is directly selected RAID groups, the volume copy control module provides update to RAID group numbers of the selected RAID groups in the volume copy management table,
wherein if the volume copy control input is RAID group ratio, the volume copy control module performs RAID group allocation from the selected ratio,
wherein if the volume copy control input is I/O performance, the volume copy control module performs RAID group allocation from the selected I/O performance, and
wherein the volume copy control input further comprises, for the primary volume, primary volume number, RAID group numbers, RAID group ratio, and I/O performance, and for each of the corresponding secondary volumes, secondary volume number, RAID group numbers, RAID group ratio, I/O performance, and an indication as to whether the secondary volume can share RAID groups with the primary volume.

12. The storage system according to claim 11, wherein the volume copy control module is configured to:
determine whether update to RAID groups of the primary volume and secondary volumes for storing the related data is changed from a previous setting and, if yes, allocated pages are rebalanced at background task;
determine whether update to RAID groups of the primary volume and secondary volumes for storing the related data is decreasing from a previous setting and, if yes, allocated pages are moved to other RAID groups and the page management table is updated; and
determine whether the RAID group for each of the secondary volumes is merged or not, and if yes, then
determine whether the merged secondary volume also has copied page or not, and if no, move a previous page to one RAID group which is chosen from new RAID groups and updates the RAID group number and page number entries of the page management table, and if yes, update the RAID group number and page number entries of the page management table to those of the merged secondary volume; and determine whether the previous page is referenced from other secondary volumes or not, and if yes delete the previous page.

13. The storage system according to claim 11,
wherein performing RAID group allocation from the selected ratio by the volume copy control module comprises:

for the primary volume in the volume copy control input, allocating RAID groups at the selected ratio, wherein the RAID group number is started from a next volume that a RAID group is lastly allocated as the primary volume; and for each secondary volume in the volume copy control input,
  if the secondary volume can share RAID groups with the primary volume, allocating RAID groups at the selected ratio from the same RAID groups of the corresponding primary volume, wherein the RAID group number is started from a next volume that a secondary volume which has the same corresponding primary volume is lastly allocated; and
  determining whether the ratio of the secondary volume is larger than a remainder ratio of remaining unallocated RAID groups, and if yes, indicating an error in allocating RAID groups, and if no, allocating RAID groups at the selected ratio from different RAID groups from those allocated to the corresponding primary volume, wherein the RAID group number is started from a next volume that a secondary volume which has the same corresponding primary volume is lastly allocated; and wherein performing RAID group allocation from the selected I/O performance by the volume copy control module comprises:

for the primary volume in the volume copy control input, allocating RAID groups from not full capacity RAID groups until a total I/O performance of RAID groups exceeds the selected I/O performance, wherein the RAID group number is started from a next volume that a RAID group is lastly allocated as the primary volume; and for each secondary volume in the volume copy control input,
  if the secondary volume can share RAID groups with the primary volume, allocating RAID groups at the selected I/O performance from the same RAID groups of the corresponding primary volume, wherein the RAID group number is started from a next volume that a secondary volume which has the same corresponding primary volume is lastly allocated; and
  determining whether the total I/O performance of remaining unallocated RAID groups is less than the selected I/O performance, and if yes, indicating an error in allocating RAID groups, and if no, allocating RAID groups at the selected I/O performance from different RAID groups from those allocated to the corresponding primary volume, wherein the RAID group number is started from a next volume that a secondary volume which has the same corresponding primary volume is lastly allocated.

* * * * *